(12) United States Patent
Kadota

(10) Patent No.: US 8,219,898 B2
(45) Date of Patent: Jul. 10, 2012

(54) DOCUMENT REGISTRATION SYSTEM, INFORMATION PROCESSING APPARATUS, AND COMPUTER USABLE MEDIUM THEREFOR

(75) Inventor: Masatoshi Kadota, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1005 days.

(21) Appl. No.: 12/155,878

(22) Filed: Jun. 11, 2008

(65) Prior Publication Data
US 2008/0307417 A1 Dec. 11, 2008

(30) Foreign Application Priority Data

Jun. 11, 2007 (JP) ................... 2007-153742
May 22, 2008 (JP) ................... 2008-134267

(51) Int. Cl.
*G06F 7/00* (2006.01)
(52) U.S. Cl. .................................................. 715/200
(58) Field of Classification Search .............. 718/101; 715/200, 255, 530; 709/200–203, 217–219
See application file for complete search history.

(56) References Cited

U.S. PATENT DOCUMENTS

| | | | | |
|---|---|---|---|---|
| 5,129,016 | A * | 7/1992 | Murakami et al. | 382/306 |
| 5,983,246 | A * | 11/1999 | Takano | 715/223 |
| 6,119,132 | A * | 9/2000 | Kuwano | 1/1 |
| 6,532,077 | B1 | 3/2003 | Arakawa | |
| 7,131,072 | B2 | 10/2006 | Yokoyama | |
| 7,246,158 | B2 * | 7/2007 | Kitada et al. | 709/219 |
| 7,304,759 | B2 * | 12/2007 | Kiyono et al. | 358/1.15 |
| 7,594,173 | B2 * | 9/2009 | Matsumoto | 715/255 |
| 2002/0161733 | A1 * | 10/2002 | Grainger | 706/45 |
| 2003/0051208 | A1 * | 3/2003 | Todaka et al. | 715/500 |
| 2003/0093425 | A1 * | 5/2003 | Shelton | 707/10 |
| 2004/0165209 | A1 | 8/2004 | Aoki et al. | |
| 2004/0177082 | A1 * | 9/2004 | Nitta et al. | 707/100 |
| 2005/0127171 | A1 * | 6/2005 | Ahuja et al. | 235/382 |
| 2006/0088336 | A1 | 4/2006 | Hirose et al. | |
| 2007/0006234 | A1 * | 1/2007 | Ogata | 718/101 |
| 2007/0180366 | A1 * | 8/2007 | Sato | 715/523 |

FOREIGN PATENT DOCUMENTS

| | | | |
|---|---|---|---|
| EP | 0361454 | * | 4/1990 |
| JP | 5-216828 | | 8/1993 |
| JP | 7-98689 | | 4/1995 |

(Continued)

OTHER PUBLICATIONS

Suzanne Liebowitz and Richard Fritzson; "Registration and Region Extraction of Data from Forms"; Paramax Systems Corporation; IEEE; 1992; pp. 173-176.*

(Continued)

*Primary Examiner* — Ella Colbert
(74) *Attorney, Agent, or Firm* — Banner & Witcoff, Ltd.

(57) ABSTRACT

A document registration system for registering a plurality of electronic documents is provided. The document registration system includes an information processing apparatus having a display unit and a storage unit. The information processing apparatus is provided with a registration unit, which can be operated to perform a registration process to register the electronic documents in an interactive processing mode, wherein the electronic documents are registered manually, and in a batch processing mode, wherein the electronic documents are registered automatically in a batch, and a first switching unit to mutually switch activation of the interactive processing mode and the batch processing mode.

18 Claims, 18 Drawing Sheets

FOREIGN PATENT DOCUMENTS

| | | |
|---|---|---|
| JP | 7-168482 | 7/1995 |
| JP | 08-171611 A | 7/1996 |
| JP | 9-102847 | 4/1997 |
| JP | 11-133519 | 5/1999 |
| JP | H11-288344 A | 10/1999 |
| JP | 2003-087484 A | 3/2003 |
| JP | 2003-177849 | 6/2003 |
| JP | 2003-316802 A | 11/2003 |
| JP | 2004-195972 | 7/2004 |
| JP | 2005-186438 | 7/2005 |
| JP | 2006-119474 | 5/2006 |
| JP | 2006-172083 | 6/2006 |
| JP | 2006-313988 A | 11/2006 |

OTHER PUBLICATIONS

Tsukasa Kochi and Takashi Saitoh; "User-defined Template for Idenifying Document Type and Extracting Information from Documents"; Sofware Research Center, Ficho Company, LID.; IEEE; Date Unknown; pp. 1-4.*

JP Notification of Reasons for Rejection dated Oct. 11, 2011, corresponding Application No. 2008-134267; English Translation.

JP Office Action mailed Apr. 24, 2012, JP Appln. 2008-134267, English translation.

* cited by examiner

| | |
|---|---|
| RECORD NUMBER | (NUMBER) |
| SCANNED DATE | (DATE) |
| DOCUMENT DATE | (DATE) |
| CLASSIFICATION | (CONTRACT, RECEIPT, DEBIT, NOTE, INTERNAL COMMUNICATION, ETC.) |
| COMMENT | ARBITRARY COMMENT |
| STATUS | (UNREGISTERED, REGISTERED WITH AUTHENTICATION, REGISTERED WITHOUT AUTHENTICATION) |
| CERTIFICATION DATA REGISTRATION NUMBER | |
| DOCUMENT DATA | (FILE PATH) |

DOCUMENT REGISTRATION SYSTEM, INFORMATION PROCESSING APPARATUS, AND COMPUTER USABLE MEDIUM THEREFOR

CROSS REFERENCE TO RELATED APPLICATION

This application claims priority from Japanese Patent Applications No. 2007-153742, filed on Jun. 11, 2007 and No. 2008-134267, filed on May 22, 2008. The entire subject matters of which are incorporated herein by reference.

BACKGROUND

1. Technical Field

An aspect of the present invention relates to a document registration system, an information processing apparatus, and a computer usable medium therefore.

2. Related Art

Conventionally, document registration systems to read paper documents and register information concerning the documents have been utilized. An example of such registration systems is disclosed in Japanese Patent Provisional Publication No. 2006-172083, and operations to be performed in the registration system disclosed are managed according to an application program for registration. The operations include a read operation to read the paper documents and generates data for electronic documents (see S710-S712 in FIG. 9 of the above-referenced publication) and a registration operation to register the electronic documents (e.g., an indexing process in FIG. 10 in the above-referenced publication), and the registration operation can be conducted in an interactive processing mode or a batch processing mode.

In the interactive processing mode, each of the plurality of electronic documents is registered one-by-one according to an operator's manual inputs (see S800-S804 in FIG. 10 in the above-referenced publication). Meanwhile, in the batch processing mode, a plurality of electronic documents are registered in a bundle (see S800, S804, S815-S831 in FIG. 10 in the above-referenced publication). Thus, in the conventional document registration system, the registration operations can be conducted selectively in one of the interactive processing mode and the batch processing mode. However, in the conventional document registration system, the processing modes are not configured to be switchable from one from the other when the documents are being processed.

In recent years, a movement for paperless environment has been enhanced according to development of information technologies. For example, laws to admit retaining of electric documents which have been conventionally obligated to be stored as paper-based records according to commercial laws and tax laws, such as Act on Use of Information and Communications Technology in the Course of Retaining, etc. Documents Conducted by Private Entities Pertaining to Finance Related Laws and Regulations (so-called electronic document law), have been enforced. Accordingly, improvement of the document registration systems in efficiencies has been desired.

SUMMARY

In view of the above, the present invention is advantageous in that a document registration system capable of efficiently registering electronic documents and a computer usable medium therefore are provided.

According to an aspect of the invention, there is provided a document registration system capable of registering a plurality of electronic documents. The document registration system includes an information processing apparatus having a display unit to display information concerning the electronic documents and capable of being connected with a network, a storage unit to store the registered electronic documents. The information processing apparatus is provided with a registration unit, which can be operated to perform a registration process to register the electronic documents in an interactive processing mode, wherein the electronic documents are registered manually, and in a batch processing mode, wherein the electronic documents are registered automatically in a batch, and a first switching unit to mutually switch activation of the interactive processing mode and the batch processing mode.

According to another aspect of the invention, there is provided an information processing apparatus capable of registering a plurality of electronic documents manually one-by-one and automatically in a batch. The information processing apparatus includes a display unit to display information concerning the electronic documents, a registration unit, which can be operated to perform a registration process to register the electronic documents in an interactive processing mode, wherein the electronic documents are registered manually, and in a batch processing mode, wherein the electronic documents are registered automatically in a batch, and a first switching unit to mutually switch activation of the interactive processing mode and the batch processing mode.

According to another aspect of the invention, there is provided a computer usable medium comprising a computer readable instructions to control a computer to register a plurality of electronic documents manually one-by-one and automatically in a batch. The computer readable instructions controls the computer by executing steps of activating a first interactive processing mode, in which the electronic documents are registered manually, and canceling the first interactive processing mode when a batch processing mode, in which the electronic documents are registered automatically in a batch is called and activating the batch processing mode.

According to the above configurations, activation of the interactive processing mode and the batch processing mode can be mutually switched.

Further, the interactive processing mode can be activated in parallel with the batch processing mode by the second switching unit so that one of the electronic documents subjected to be processed in the registration process in the batch processing mode can be independently processed in the interactive processing mode. Therefore, for example, even when an error occurs in the registration process in the batch processing mode, the electronic document having been processed can be shifted in the interactive processing mode.

Thus, the registration process for the electronic documents can be performed efficiently.

The registration process may include appending information associated with the electronic documents, such as a record number, a scanned date, a creation date of the original document, a comment concerning the document, and a hash value, to the electronic documents to be stored in a storage unit. The registration process can be compliant with a so-called electronic document law.

BRIEF DESCRIPTION OF THE ACCOMPANYING DRAWINGS

FIG. 1 schematically illustrates a configuration of a document registration system according to an embodiment of the present invention.

FIG. 2 schematically illustrates behavioral flows of a registration program to be run in the document registration system according to the embodiment of the present invention.

FIG. 3 schematically illustrates a dialog window for an interactive processing mode according to the embodiment of the present invention.

FIG. 4 schematically illustrates a dialog window for a batch processing mode according to the embodiment of the present invention.

DETAILED DESCRIPTION

Hereinafter, an embodiment according to an aspect of the present invention will be described with reference to the accompanying drawings.

Figure 1:
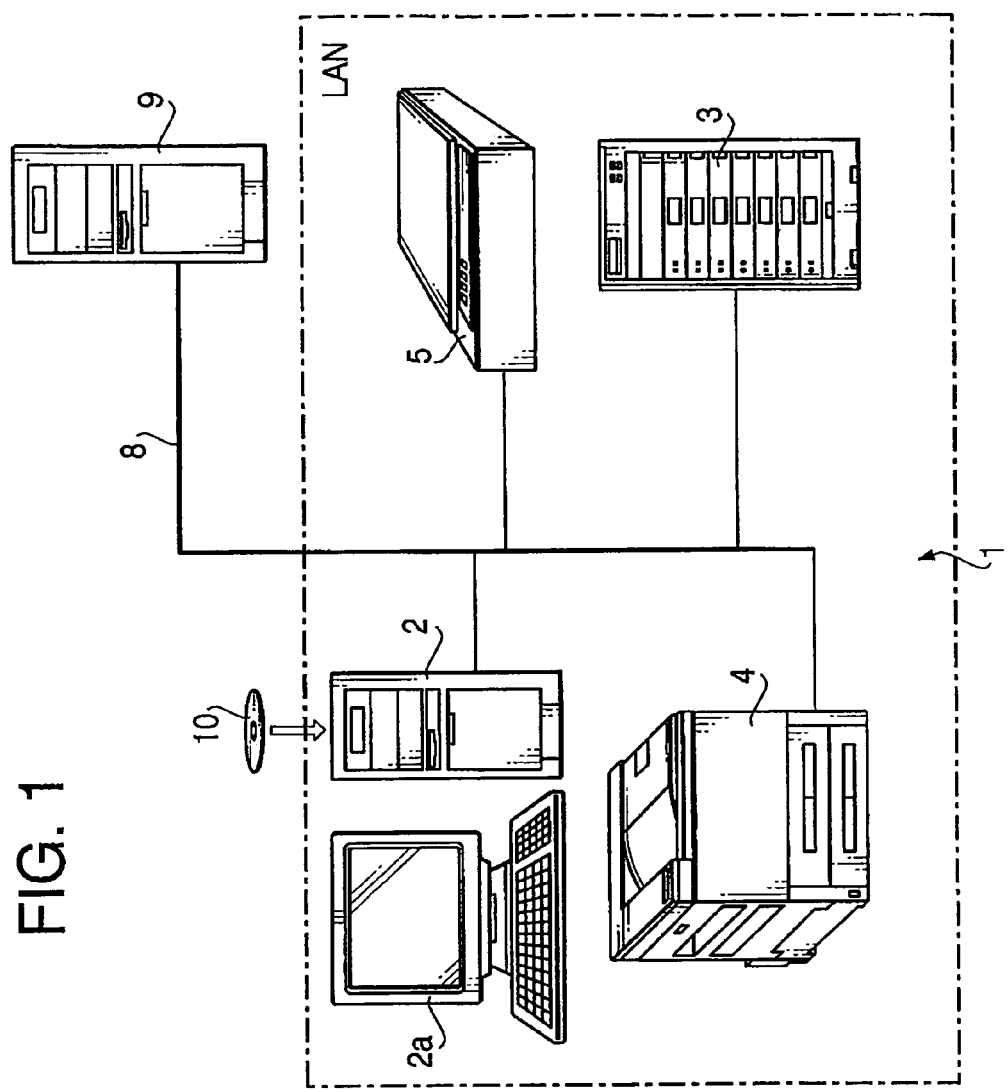

FIG. 1 schematically illustrates a configuration of a document registration system 1 according to the embodiment of the present invention. The document registration system 1 includes an information processing apparatus 2, a storage unit 3, a printing apparatus 4 to form an image on a recording medium, and a scanning apparatus 5 to read an image formed on a recording medium, which are interconnected through a LAN (local area network). The information processing apparatus 2, the storage unit 3, the printing apparatus 4, and the scanning apparatus 5 are in known configurations; therefore, description of those is omitted herein. It is to be noted that the number of the information processing apparatus 2 to be included in the document registration system 1 may be one or more.

The information processing apparatus 2 is configured to be connectable with another information processing apparatus, such as a server, of a certification organization 9 which is a time certification authority through a network such as the internet 8. The certification organization 9 is an organization which can provide time stamps, digital signatures, has data for identifying electronic document, and so on to certify authenticity of electronic documents in compliance with the electronic document law.

An application program, a registration program 10, to perform a reading process to paper-based documents and generate electronic documents and a registration process to register the electronic documents is installed in the information processing apparatus 2. The documents to be read in the reading process include visually readable documents which are formed on recording media such as microfilms.

In the present embodiment, the registration process include a process to store the electronic documents with associated information being appended in the storage unit 3 and a process to authenticate the electronic documents by, for example, appending digital signatures and time stamps, which are supported by the electronic document law, thereto. The associated information represents, for example, a record number, a date of scan, a date of document creation, a comment to the document, a hash value, etc, and can be automatically appended to the data representing each electronic document based on information obtained upon scanning the paper-based documents. In the present embodiment, when a document is stored in the storage unit 3 with the associated information through the former process, registration status of the document is "registered (without authentication)." When a registered electronic document is authenticated through the latter process, the registration status of the document is indicated as "registered with authentication." In addition, registration status of an electronic document which has been through neither of the processes is "unregistered (no authentication)."

Figure 2:
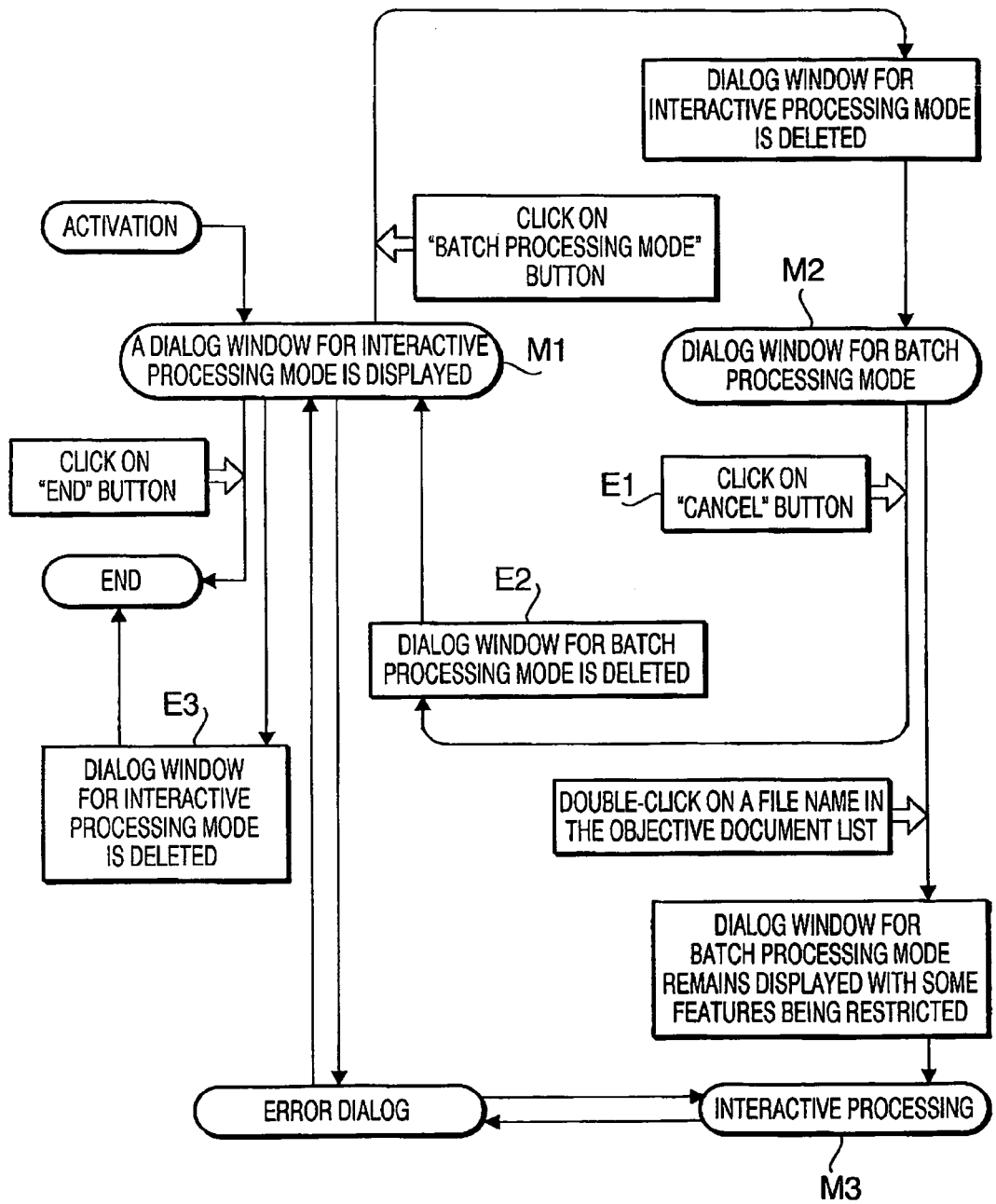

FIG. 2 schematically illustrates behavioral flows of the registration program 10 to be run in the document registration system 1 according to the embodiment of the present invention. As shown in FIG. 2, the registration program 10 can be run in an interactive processing mode M1 and in a batch processing mode M2, and activation of the processing modes M1, M2 can be mutually switched. Further, the registration program 10 can be run in another interactive processing mode M3, which can be activated in parallel with the batch processing mode M2 in a predetermined condition to apply a predetermined process to the electronic documents. Hereinafter, the reading process and the registration process (with or without authentication) of the registration program 10 to be run in each processing mode will be described with reference to FIG. 2.

Firstly, the registration program 10 is activated by user operation given to the information processing apparatus 2 to be run in the interactive processing mode M1. Next, a dialog window 100 (FIG. 3) for the interactive processing mode is displayed on a display screen 2a of the information processing apparatus 2.

In the interactive processing mode M1, which will be described later in detail, a plurality of paper-based documents are read one-by-one to be stored according to user operations through the scanning apparatus in the reading process, and a plurality of electronic documents being stored are registered (with or without authentication) one-by-one according to user operations through the information processing apparatus 2 in the registration process.

Figure 3:
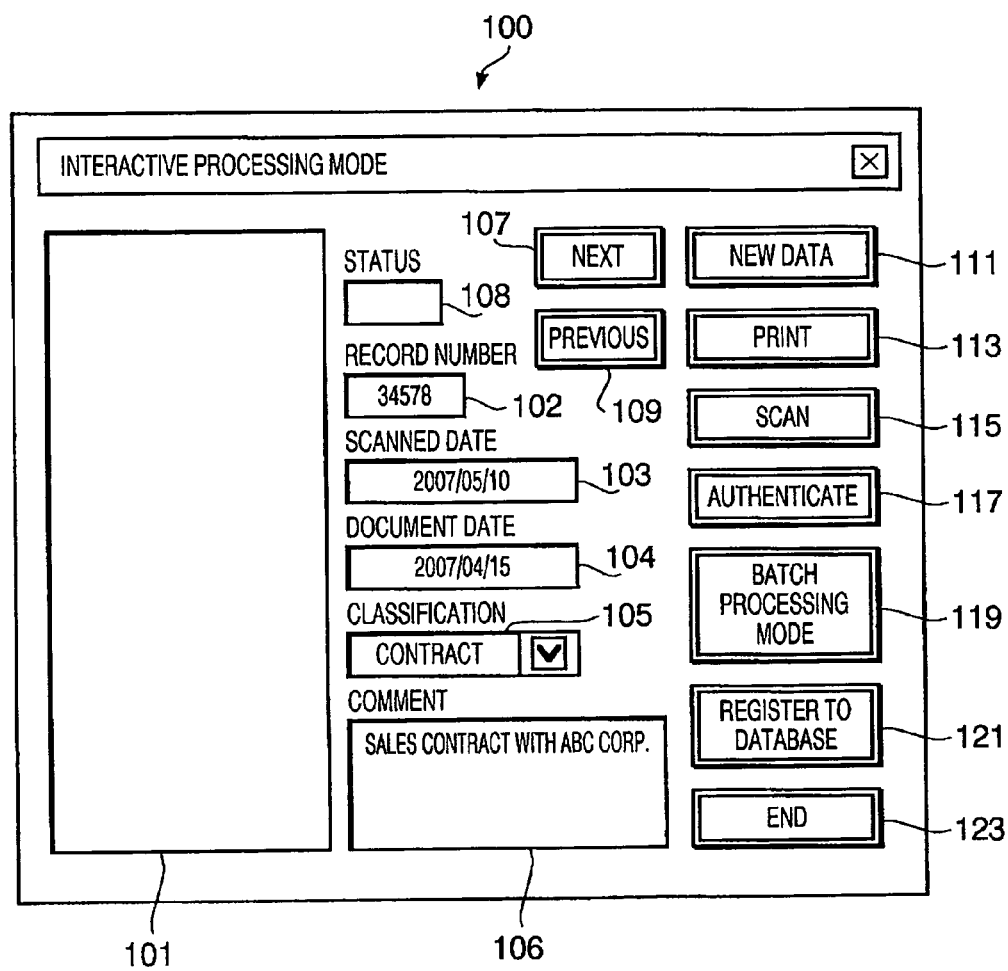

FIG. 3 schematically illustrates the dialog window 100 for the interactive processing mode according to the embodiment of the present invention. During the interactive processing mode M1, when an "End" button 123 provided in the vicinity of a lower-right end of the dialog window 100 is clicked, the registration program 10 is terminated (see FIG. 2).

In the interactive processing mode M1, when a "batch processing mode" button 119 provided on a lower-right side of the dialog window 100 is clicked, the interactive processing mode M1 is terminated, and the dialog window 100 is deleted (E3 in FIG. 2). Thereafter, the batch processing mode M2 is activated, and a dialog window 200 for the batch processing mode M2 is displayed on the display screen 2a of the information processing apparatus 2.

In the batch processing mode M2, which will be described later in detail, a plurality of electronic documents are processed to be authenticated collectively in the registration process.

Figure 4:
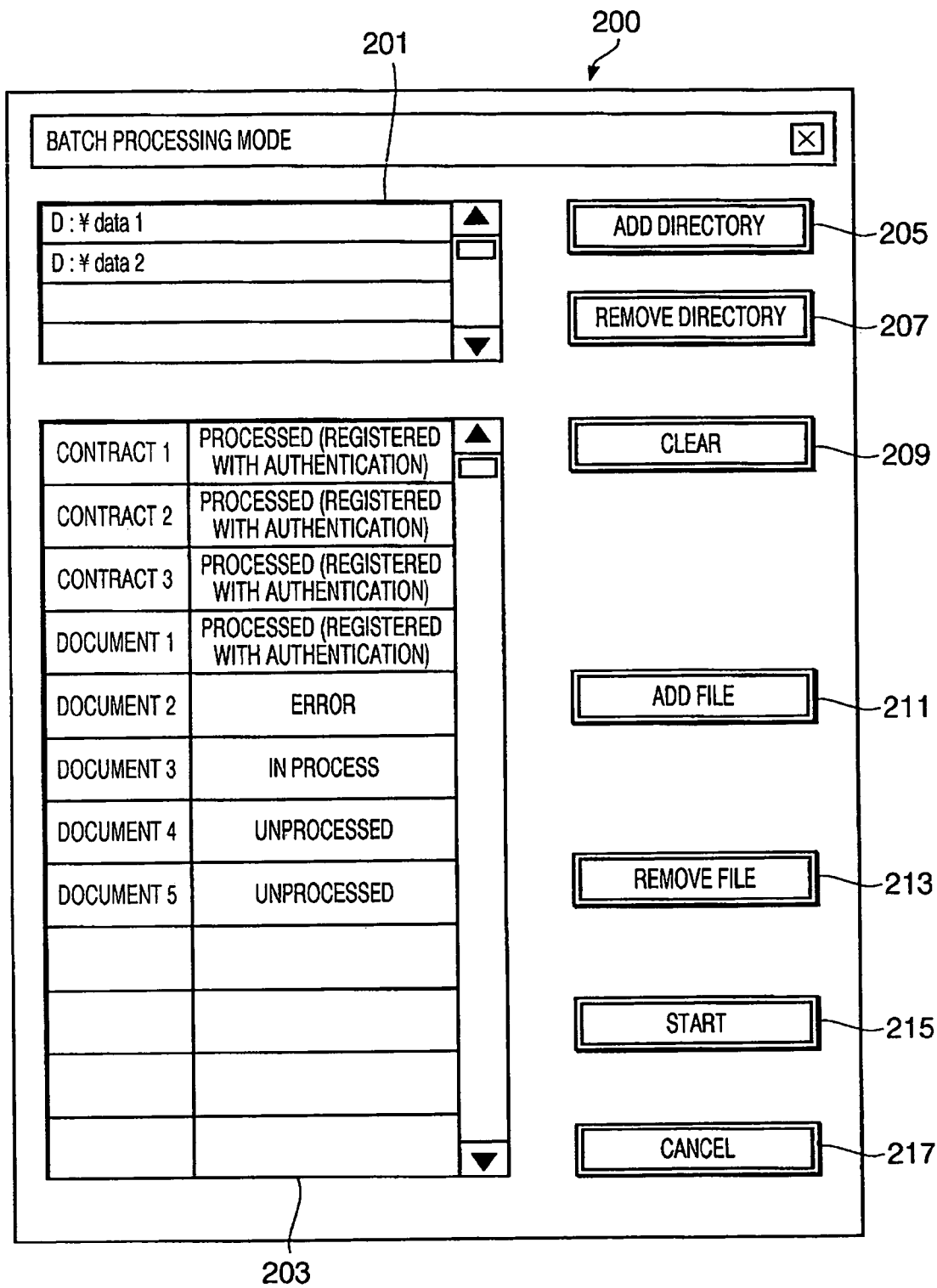

FIG. 4 schematically illustrates a dialog window 200 for the batch processing mode M2 according to the embodiment of the present invention. In the batch processing mode M2, when a "cancel" button 217 provided in vicinity of a lower-right end of the dialog window 200 is clicked (E1 in FIG. 2), the batch processing mode M2 is terminated, and the dialog window 200 for the batch processing mode M2 is deleted (E2). Thereafter, the interactive processing mode M1 is activated, and the dialog window 100 for the interactive processing mode is once again displayed on the display screen 2a of the information processing apparatus 2.

Thus, activation of the interactive processing mode M1 and the batch processing mode M2 is mutually switched by the batch processing mode button 119 in the dialog window 100 and the cancel button 217 in the dialog window 200.

In the batch processing mode M2, as shown in FIG. 4, the dialog window 200 is displayed. The dialog window 200 includes an objective document list area 203, which indicates at least one file name of a document to be registered in the registration process. In FIG. 4, the objective document list area 203 is displayed on a lower-left side of the dialog window 200. During a batch registration process, when one of the documents listed in the objective document list area 203 is designated, for example, by a double-clicking the file name of the document, the interactive processing mode M3 is activated in parallel with the batch processing mode M2 (see FIG. 2). The interactive processing mode M3 is configured to be identical to the interactive processing mode M1 except for the electric documents to be processed therein. In other words, when the interactive processing mode M3 is activated, the dialog window 100 (FIG. 3) is displayed on the display screen 2a of the information processing apparatus 2. In the interactive processing mode M3, however, some of the features included therein are restricted. Such restricted features will be described later in detail.

Thus, during the batch processing mode M2, when one of the documents listed in the objective document list area 203 is double-clicked, the interactive processing mode M3 to process the double-clicked document list is activated. Meanwhile, the batch processing mode M2 remains activated, but the registration process for the double-clicked electronic document is refrained while the remaining electronic documents in the objective document list area 203 are processed to be registered (with or without authentication). Indication that the electronic document being designated through the objective document list area 203 is refrained from being processed is provided in the objective document list area 203.

Next, routines to be run in the document registration system 1 in the interactive processing mode M1 or M3 will be described in detail.

As the interactive processing mode M1 or M3 is activated, the dialog window 100 for the interactive processing mode is displayed on the display screen 2a of the information processing apparatus 2. The dialog window 100 includes a plurality of buttons 107-123 to be operated by a user, as shown in FIG. 3. Further, a preview area 101 is provided on a left-hand side of the dialog window 100. The preview area 101 is an area to display one of the electronic documents which is to be processed for the user to preview. When a "next" button 107 is clicked, an electronic document, which has a record number following the record number of the electronic document currently being displayed, is displayed. When a "previous" button 109 is clicked, an electronic document, which has a record number preceding the record number of the electronic document currently being displayed, is called. The fields 102-106 provided in the vicinity of the center of the dialog window 100 indicate information associated with the objective electronic document. The associated information can be directly entered in the fields 102-106 by the user so that the once registered associated information can be arbitrarily modified or added. A "record number" field 102 indicates an automatically generated and uniquely assigned number of the electronic document which is currently displayed. A "scanned date" field 103 indicates a date of the electronic document was scanned through the scanning apparatus 5. A "document date" field 104 indicates a date of the original paper-based document was created. A "classification" field 105 indicates a classification of the electronic document currently being displayed. The classification includes, for example, "contract" and "business document." A "comment" field 106 indicates an arbitrary comment concerning the electronic document. The next button 107, the previous button 109, and the record number field 102 are restricted from being operated during the interactive processing mode M3.

Figure 5:
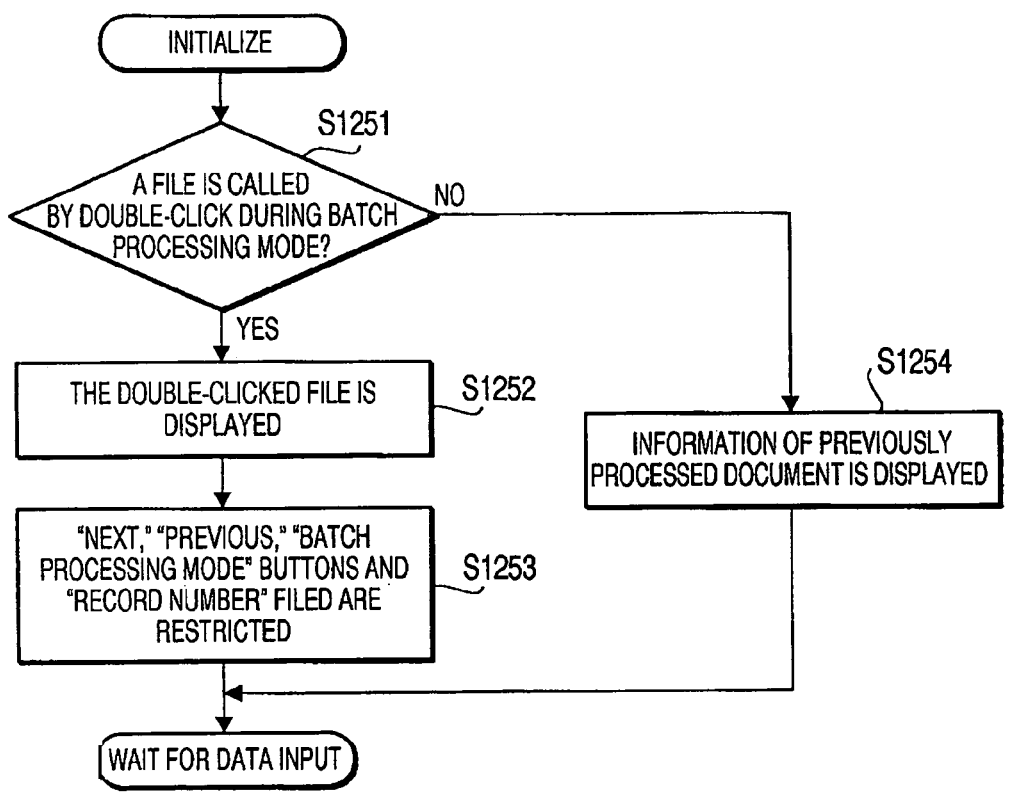
FIG. 5 is a flowchart to illustrate an initialize routine of the registration program to be run in the document registration system according to the embodiment of the present invention.

When the interactive processing mode M1 is activated, and when the interactive processing mode M3 is activated by double-clicking a specific file name in the dialog window 200 during the batch processing mode M2, an initialize routine starts. FIG. 5 is a flowchart to illustrate the initialize routine according to the embodiment of the present invention. As the routine is initiated, in S1251, it is judged as to whether the routine is called during the batch processing mode M2. That is, it is judged as to whether a specific file name displayed in the objective document list area 203 has been double-clicked during the batch processing mode M2.

If it is judged that no file name has been double-clicked (S1251: NO), it is determined that the interactive processing mode M1 is activated. Accordingly, in S1254, information associated with the electronic document which had been in process when the interactive processing mode M1 or M3 was terminated previously is obtained from a database in the storage unit 3 to display in the fields 101-106. In this regard, the registration status of the electronic document is displayed in a registration status indication window 108 (FIG. 3). That is, in the case where the electronic document is not yet registered, the registration status "unregistered" is displayed. In the case where the electronic document is registered without authentication, the registration status of the electronic document "registered without authentication" is displayed. Further, the display of the registration status can be updated to "registered with authentication" according to transition of the registration statuses. Thereafter, the routine is terminated, and the information processing apparatus 2 waits for data inputs.

Meanwhile, in S1251, if it is judged that a file name has been double-clicked (S1251: YES), it is determined that the interactive processing mode M3 is activated. Accordingly, in S1252, the information associated with the electronic document which has been double-clicked is displayed in the fields 101-106.

In S1253, the next button 107, the previous button 109, the record number field 102, and the batch processing mode button 119 are displayed in gray and set to be incapable of being operated so that the user is not allowed to input through the grayed buttons and field. Thus, the electronic documents other than the specified electronic document being displayed in the preview area 101 are refrained from the registration process. The routine is terminated thereafter, and the information processing apparatus 2 waits for data input.

Figure 6:
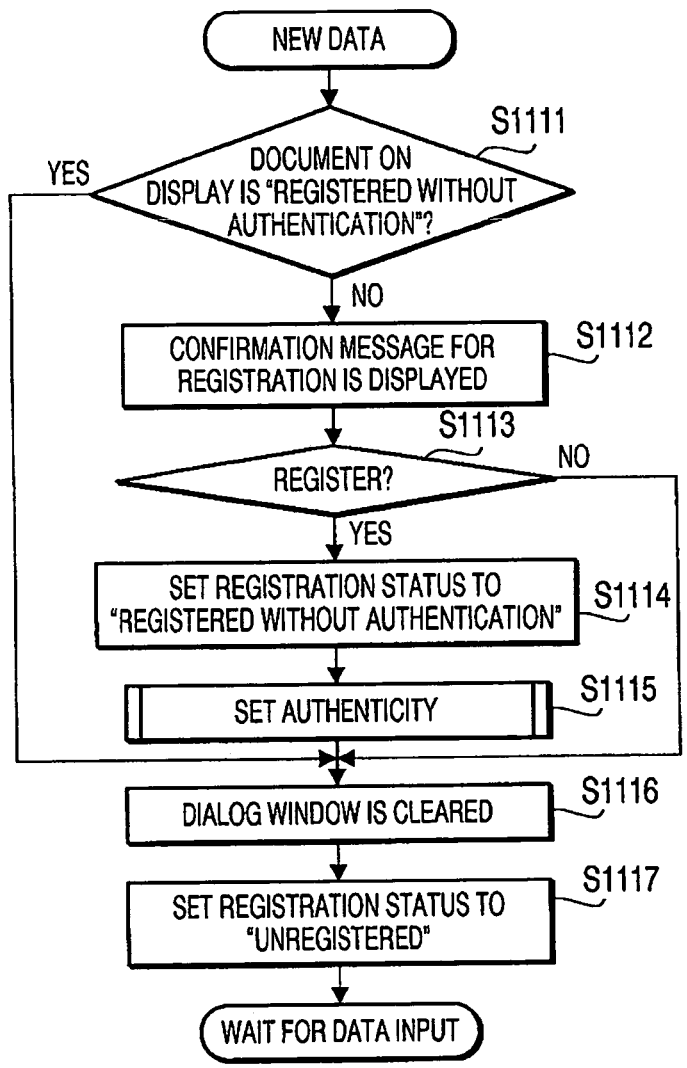
FIG. 6 is a flowchart to illustrate a register routine of the registration program to be run in the document registration system according to the embodiment of the present invention.

Next, a new data (with or without authentication) routine will be described with reference to FIG. 6. FIG. 6 is a flowchart to illustrate the register routine according to the embodiment of the present invention. When a "new data" button 111, which is provided on an upper-right end of the dialog window 100, is clicked during the interactive processing mode M1 or M3, the register routine is initiated. In S1111, it is judged as to whether the registration status of the electronic document currently being displayed in the preview area 101 is "registered without authentication."

If the registration status is "registered without authentication" (S1111: YES), the routine proceeds to S1116. If the registration status is not "registered without authentication" (S1111: NO), i.e., the registration status is "unregistered," in S1112, a confirmation window, which indicates a message to inquire the user as to whether the electronic document currently being displayed should be registered (with or without authentication), is displayed on the display screen 2a of the information processing apparatus 2. In S1113, it is judged as to whether the user's input to confirm the registration is provided.

Figure 13:
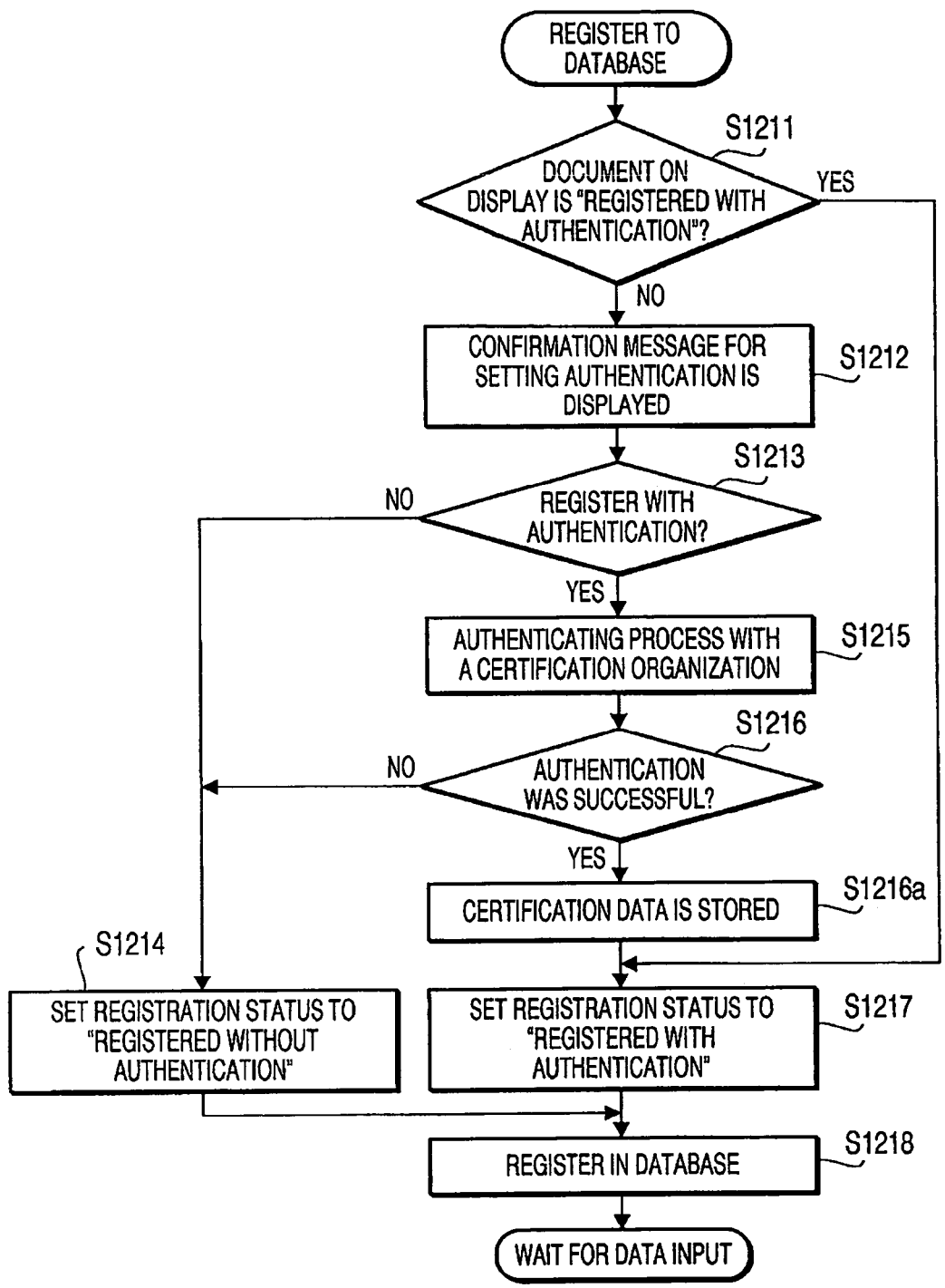
FIG. 13 is a flowchart to illustrate an authentication and registration routine of the registration program to be run in the document registration system according to the embodiment of the present invention.

If the user's input to confirm the registration is not provided (S1113: NO), the routine proceeds to S1116. In S1113, if the registration status of the current electronic document is "registered with authentication," the user may select not to provide an input to confirm the registration (S1113: NO). If the user's input to confirm the registration is provided (S1113: YES), in S1114, the registration status of the electronic document is set to be "registered" (with or without authentication). Thereafter, in S1115, a process to register the electronic document with or without authentication is performed. In S1115, an authenticity setting routine including S1211-S1218, which will be described later in detail with reference to FIG. 13, are performed.

Following S1115, in S1116, the associated information indicated in the preview area 101 and the fields 102, 104-106 of the dialog window 100 for the interactive processing mode M1 or M2 are cleared. That is, the area and the fields 101-102, 104-106 become blank. The "record number" field 102 indicates an automatically generated and uniquely assigned number of the electronic document which is currently displayed. In S1117, the registration status of an electronic document, which is stored to be processed for the registration, is set to be "unregistered." Thereafter, the routine is terminated, and the information processing apparatus 2 waits for data inputs.

Figure 7:
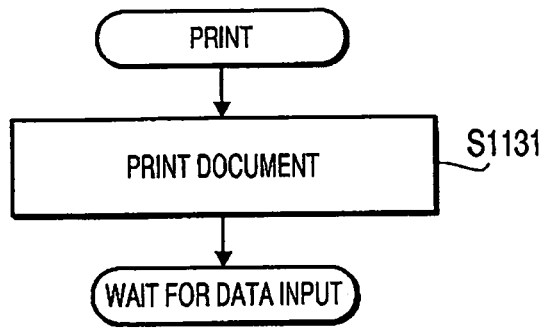
FIG. 7 is a flowchart to illustrate a print routine of the registration program to be run in the document registration system according to the embodiment of the present invention.

Next, a print routine will be described with reference to FIG. 7. FIG. 7 is a flowchart to illustrate the print routine according to the embodiment of the present invention. When a "print" button 113, which is provided on an upper-right side of the dialog window 100, is clicked during the interactive processing mode M1 or M3, the print routine is initiated. In S1131, the printing apparatus 4 is driven to print the electronic document which is displayed in the preview area 101. Upon completion of the printing, the routine is terminated, and the information processing apparatus 2 waits for data input.

Figure 8:
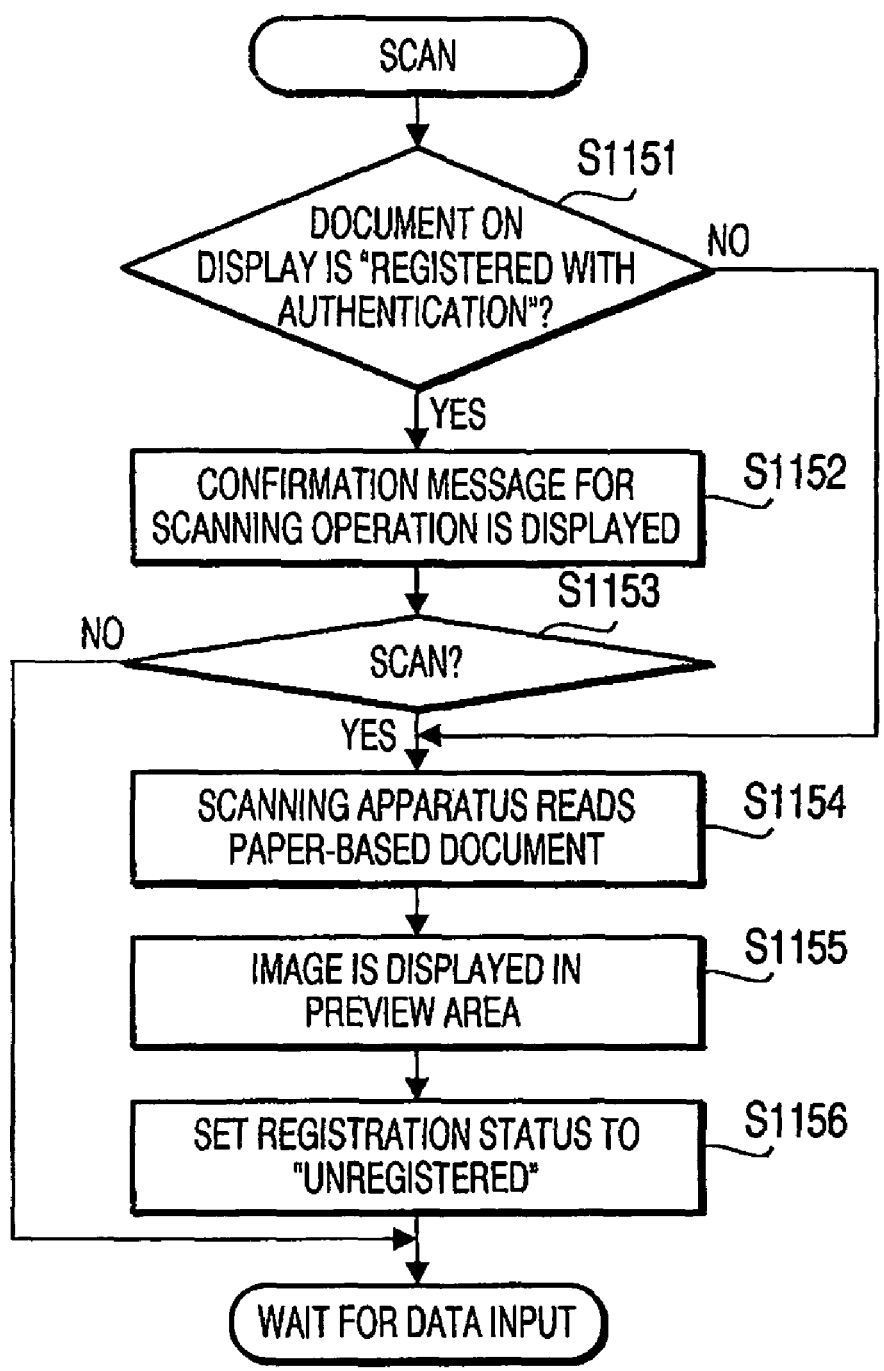
FIG. 8 is a flowchart to illustrate a scan routine of the registration program to be run in the document registration system according to the embodiment of the present invention.

Next, a scan routine will be described with reference to FIG. 8. FIG. 8 is a flowchart to illustrate the scan routine according to the embodiment of the present invention. When a "scan" button 115, which is provided on a right-hand side of the dialog window 100, is clicked during the interactive processing mode M1 or M3, the scan routine to scan a new paper-based document to be replaced with the electronic document being currently displayed in the preview area 101 is initiated. In S1151, it is judged as to whether the registration status of the electronic document, which is currently displayed in the preview area 101, is "registered with authentication."

In S1151, if the registration status is not "registered with authentication" (S1151: NO), i.e., the registration status of the current electronic document is "registered without authentication," the routine proceeds to S1154. If the registration status is "registered with authentication" (S151:YES), in S1152, a confirmation window, which indicates a message to inquire the user as to whether an operation to scan the paper-based document to replace the currently displayed electronic document should be performed while the electronic document currently being displayed is registered with authentication, is displayed on the display screen 2a of the information processing apparatus 2. Thereafter, in S1153, it is judged as to whether the user's input to confirm the scanning is provided.

If the user's input to confirm the scanning is not provided (S1153: NO), the routine is terminated, and the information processing apparatus 2 waits for data input. If the user's input to confirm the scanning is provided (S1153: YES), in S1154, the scanning apparatus 4 is driven, and an image formed on the paper-based document which is arranged in the scanning apparatus 4 is read so that an electronic document corresponding to the paper-based document is generated.

Following S1154, in S1155, the image of the electronic document obtained in S1154 is displayed in the preview area 101, and associated information, obtained upon scanning, which is associated with the electronic document, is displayed in the fields 102-106.

Following S1155, in S1156, the registration status of the scanned electronic document is set to be "unregistered." Thereafter, the routine is terminated, and the information processing apparatus 2 waits for data input.

Figure 9:
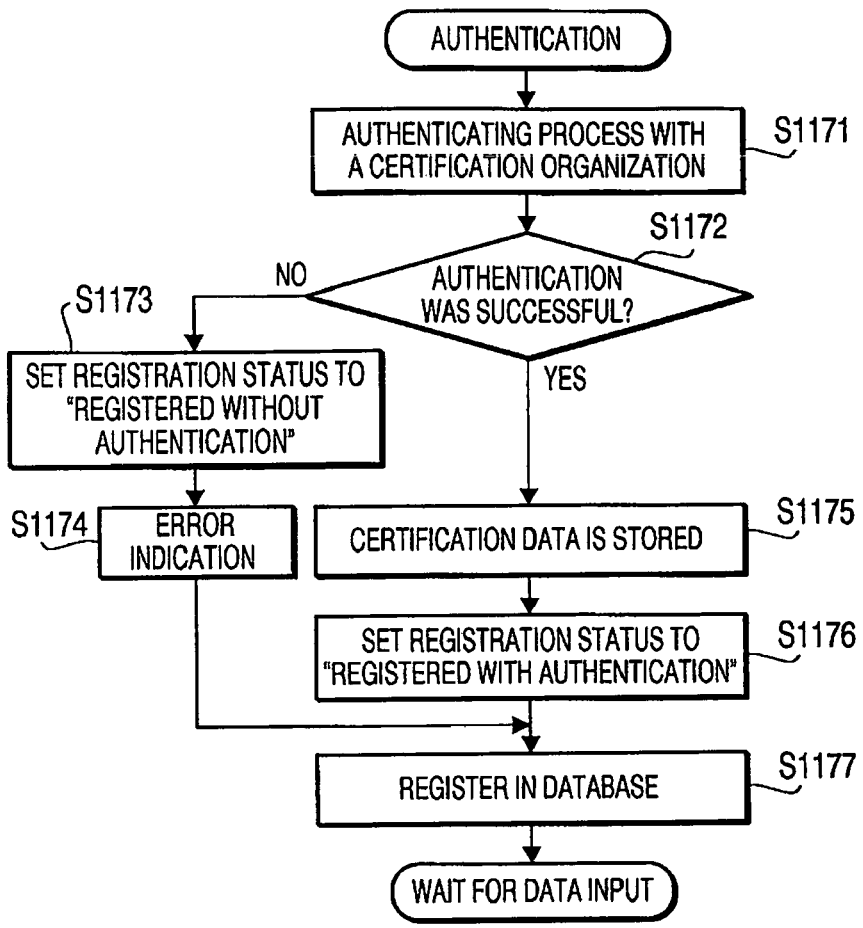
FIG. 9 is a flowchart to illustrate an authentication routine of the registration program to be run in the document registration system according to the embodiment of the present invention.
Figure 10:
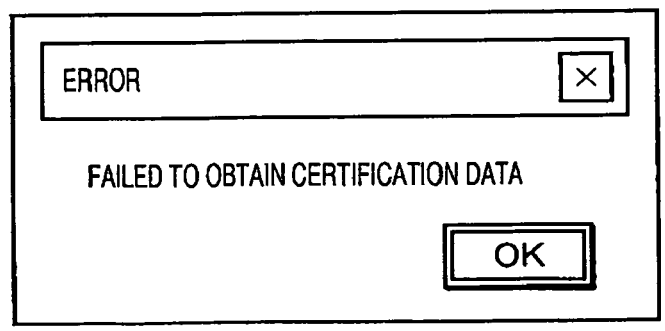
FIG. 10 illustrates an error indication of the registration program to be run in the document registration system according to the embodiment of the present invention.

Next, an authentication routine will be described with reference to FIG. 9. FIG. 9 is a flowchart to illustrate the authentication routine according to the embodiment of the present invention. When an "authentication" button 117, which is provided on the right-hand side of the dialog window 100, is clicked during the interactive processing mode M1 or M3, the authentication routine is initiated. In S1171, an authenticating process with the certification organization 9 is performed. More specifically, the information processing apparatus 2 transmits information to be used for certification, such as a hash value of the electronic document to be certified, to the certification organization 9 through the internet 8 and requests for a necessary certifying process, such as providing a time stamp, to certify authenticity of the electronic document.

Thereafter, in S1172, it is judged as to whether the authentication was successful. If the authentication was not successful (S1172: NO), in S1173, the registration status of the electronic document is set to be "registered without authentication." In S1174, an error indication including a message to inform the user of the failure in obtaining the authentication is displayed on the display screen 2a of the information processing apparatus 2, which waits for the user's input (e.g., pressing an "OK" button displayed in the error indicating message window) to confirm the error. When the user's input is provided, the routine proceeds to S1177. The electronic document with the registration status "registered without authentication" is included to be an objective document for the batch processing mode M2, which will be described later in detail.

In S1172, if the authentication was successful (S1172: YES), in S1175, certification data being the associated information of the electronic document is obtained from the certification organization 9 and stored in a storage of the information processing apparatus 2.

Figures 11, 12:
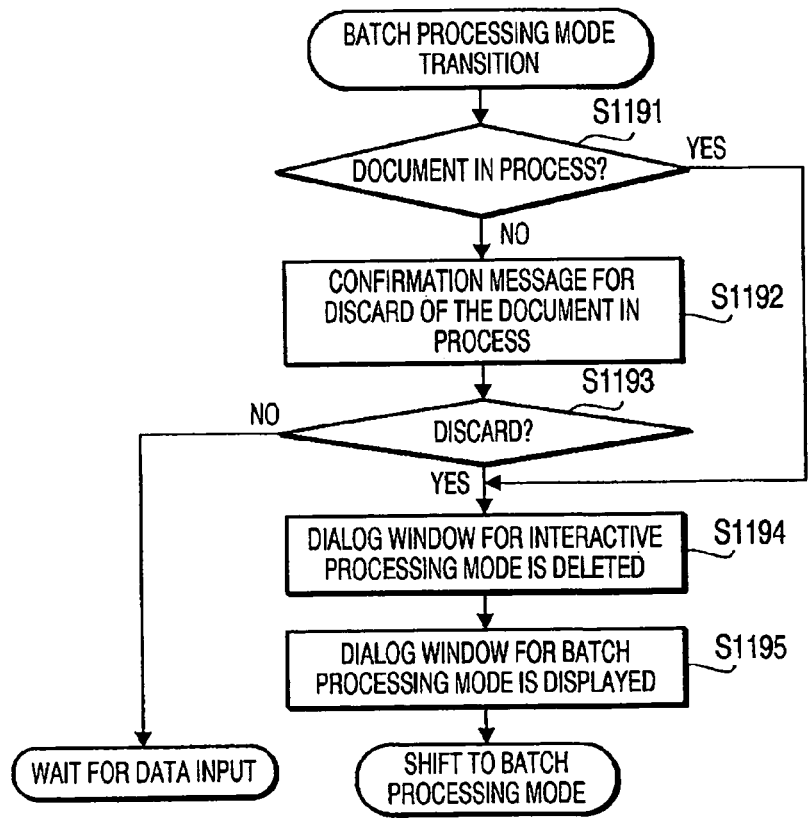
FIG. 11 illustrates items representing associated information to be used in the document registration system 1 according to the embodiment of the present invention.
FIG. 12 is a flowchart to illustrate a batch processing mode transition routine of the registration program to be run in the document registration system according to the embodiment of the present invention.

Thereafter, in S1176, the registration status of the electronic document is set to be "registered with authentication," and the routine proceeds to S1177. In S1177, the electronic document with the associated information is stored to be registered in a database of the storage unit 3. FIG. 11 illustrates items representing the associated information to be used in the document registration system 1 according to the embodiment of the present invention. Following S1177, the routine is terminated, and the information processing apparatus 2 waits for data input.

Next, a batch processing mode transition routine will be described with reference to FIG. 12. FIG. 12 is a flowchart to illustrate the batch processing mode transition routine according to the embodiment of the present invention. When a "batch processing mode" button 119, which is provided on a lower-left side of the dialog window 100, is clicked during the interactive processing mode M1, the batch processing mode transition routine is initiated. In S1191, it is judged as to whether there is an electronic document being processed.

In S1191, if it is judged that no electronic document is in process (S1191: NO), the routine proceeds to S1194. If there is an electronic document in process (S1191: YES), in S1192, a confirmation window, which indicates a message to inquire the user as to whether the electronic document currently being displayed should be discarded without being registered, is displayed on the display screen 2a of the information processing apparatus 2. In S1193, it is judged as to whether the user's input to confirm the discard is provided.

If the user's input to confirm the discard is not provided (S1193: NO), the routine is terminated, and the information processing apparatus 2 waits for data input. If the user's input to confirm the discard is provided (S1193: YES), in S1194, the dialog window 100 for the interactive processing mode M1 is deleted.

Following S1194, in S1195, the dialog window 200 for the batch processing mode M2 is displayed on the display screen 2a of the information processing apparatus 2. Thereafter, the routine is terminated, and the information processing apparatus 2 enters the batch processing mode M2.

Next, a register to DB routine will be described with reference to FIG. 13. FIG. 13 is a flowchart to illustrate the authenticity setting routine according to the embodiment of the present invention. When a "register to DB" button 121, which is provided on the lower right-hand side of the dialog window 100, is clicked during the interactive processing mode M1 or M3, the authenticity setting routine is initiated. In S1211, it is judged as to whether the registration status of the electronic document, which is currently displayed in the preview area 101, is "registered with authentication."

In S1211, if the registration status is "registered with authentication" (S1211: YES), in S1217, the routine proceeds to S1217. If the registration status is not "registered with authentication" (S1211: NO), i.e., the registration status is either "unregistered" or "registered without authentication," in S1212, a confirmation window, which indicates a message to inquire the user as to whether the electronic document currently being displayed should be registered with authentication, is displayed on the display screen 2a of the information processing apparatus 2. In S1213, it is judged as to whether the user's input to confirm the registration with authentication is provided.

If the user's input to confirm the registration with authentication is not provided (S1213: NO), the routine proceeds to S1214. If the user's input to confirm the registration with authentication is provided (S1213: YES), in S1215, the authenticating process is performed with the certification organization 9.

Thereafter, in S1216, it is judged as to whether the authentication was successful. If the authentication was not successful (S1216: NO), in S1214, the registration status of the electronic document is set to be "registered without authentication," and the routine proceeds to S1218.

In S1216, if the authentication was successful (S1216: YES), in S1216a, certification data being the associated information of the electronic document is obtained from the certification organization 9 and stored in a storage of the information processing apparatus 2. Thereafter, in S1217, the registration status of the electronic document is set to be "registered with authentication," and the routine proceeds to S1218. In S1218, the electronic document with the associated information is stored to be registered (with or without authentication) in the database of the storage unit 3. The associated information may include authentication information (time stamp, digital signatures, and so on). Thereafter, the routine is terminated, and the information processing apparatus 2 waits for data input.

Figure 14:
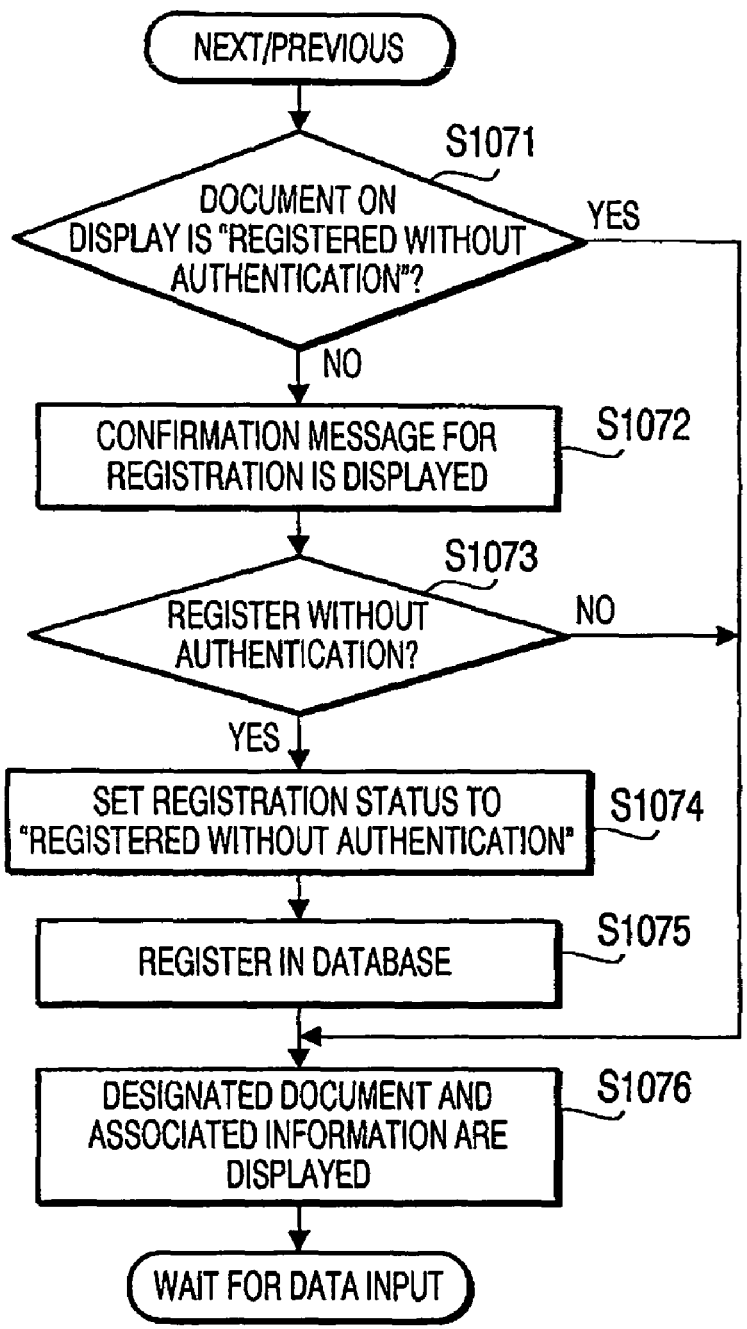
FIG. 14 is a flowchart to illustrate a next/previous/designated document display routine of the registration program to be run in the document registration system according to the embodiment of the present invention.

Next, a next designated document display routine/a previous designated document display routine will be described with reference to FIG. 14. FIG. 14 is a flowchart to illustrate the next/previous/designated document display routine according to the embodiment of the present invention. When a "next" button 107 and a "previous" button 109, which are provided on an upper portion of the dialog window 100, are clicked during the interactive processing mode M1, the next/previous/designated document display routine is initiated.

The next/previous/designated document display routine is also initiated when a record number to identify a specific electronic document is inputted in the record number field 102 in the dialog window 100. In S1071, it is judged as to whether the registration status of the electronic document, which is registered (with or without authentication) currently displayed in the preview area 101, is "registered without authentication."

If the registration status is "registered without authentication" (S1071: YES), the routine proceeds to S1076. If the registration status is not "registered without authentication" (S1071: NO), i.e., the registration status is "unregistered," in S1072, a confirmation window, which indicates a message to inquire the user as to whether the electronic document currently being displayed should be registered without authentication, is displayed on the display screen 2a of the information processing apparatus 2. In S1073, it is judged as to whether the user's input to confirm the registration is provided.

If the user's input to confirm the registration is not provided (S1073: NO), the routine proceeds to S1076. If the user's input to confirm the registration without authentication is provided (S1073: YES), in S1074, the registration status of the electronic document is updated to be "registered without authentication." In S1075, the electronic document is stored to be registered without authentication in the database of the storage unit 3. Thereafter, the routine proceeds to S1076.

S1076, the electronic document designated by one of the next button 107, the previous button 109, and the record number field 102 and the associated information are displayed in the preview area 101 and the fields 102-106. Thereafter, the routine is terminated, and the information processing apparatus 2 waits for data input.

Figure 15:
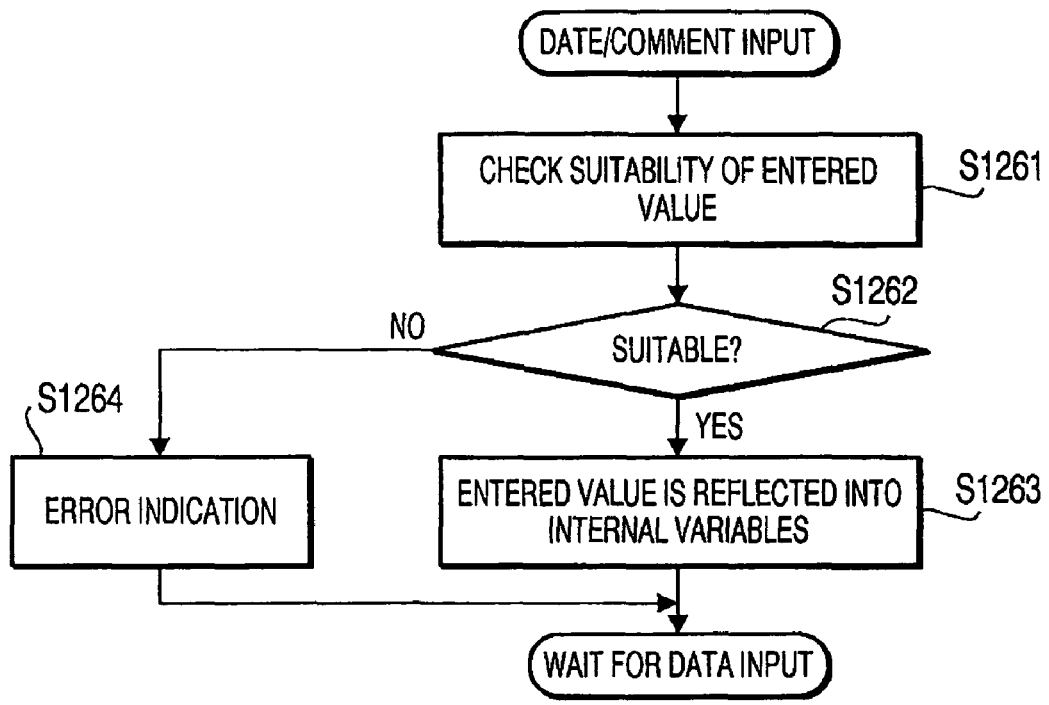
FIG. 15 is a flowchart to illustrate a date/comment input routine of the registration program to be run in the document registration system according to the embodiment of the present invention.

Next, a date/comment input routine will be described with reference to FIG. 15. FIG. 15 is a flowchart to illustrate the date/comment input routine according to the embodiment of the present invention. When the user enters data in one of the "scanned date" field 103, the "document date" field 104, the "classification" field 105, and the "comment" field, which are provided in the vicinity of the center of the dialog window 100 during the interactive processing mode M1 or M3, the date/comment input routine is initiated.

In S1261, suitability of the entered value is checked. For example, when a date is entered, a format and correctness of the date are examined. For another example, as to whether a count of entered characters is within a predetermined upper limit, and as to whether forbidden character codes are not included, are examined. Thus, in S1262, it is determined as to whether the entered value is suitable to the field. If the value is suitable (S1262: YES), in S1263, the entered value is reflected into internal variables corresponding to the field. Thereafter, the routine is terminated, and the information processing apparatus 2 waits for data input.

Figure 16:
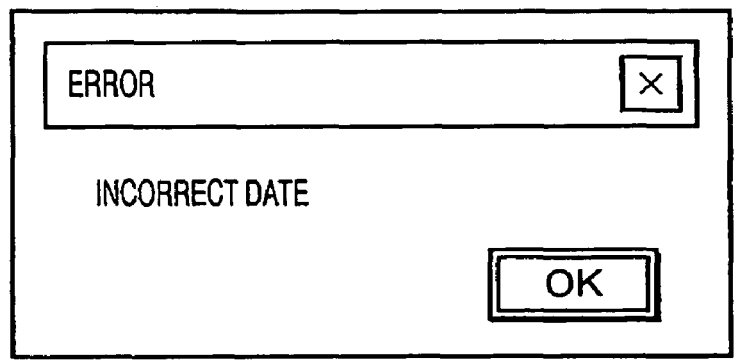
FIG. 16 illustrates another error indication of the registration program to be run in the document registration system according to the embodiment of the present invention.

In S1262, if the value is unsuitable (S1262: NO), in S1264, an error indication including a message to inform the user of the incorrectness of the entered value, for example as shown in FIG. 16, is displayed on the display screen 2a of the information processing apparatus 2, which waits for the user's input (e.g., pressing an "OK" button displayed in the error indicating message window) to confirm the error. When the user's input is provided, the routine is terminated, and the information processing apparatus waits for data input.

Thus, in the interactive processing mode M1, each of a plurality of paper-based documents can be read in the reading process and registered (with or without authentication) in the registration process. Meanwhile, in the interactive processing mode M3, one of the electronic documents designated by double-clicking of a file name thereof during the batch processing mode M2 can be registered (with or without authentication) independently in the registration process.

Next, routines to be run in the document registration system 1 in the batch processing mode M2 according to the embodiment of the present invention will be described in detail.

In the batch processing mode M2, the dialog window 200 for the batch processing mode M2 is displayed on the display screen 2a of the information processing apparatus 2. The dialog window 200 includes a plurality of buttons 205-217 to be operated by the user, as shown in FIG. 4. The dialog window M2 further includes a directory area 201 and the objective document list area 203. The directory area 201 displays a directory of the storage unit 3. The objective document list area 203 includes a list of the objective electronic documents, as has been described previously. In the objective document list, file names of the objective electronic documents are indicated on a left-hand side, and progress status of the processes for each document is indicated on a right-hand side. The progress status includes "unprocessed," "in process," "processed (registered with authentication)," and "error." The objective document list area 203 in FIG. 4 represents a state in which the listed electronic documents are being processed in a batch.

The dialog window 200 further includes an "add directory" button 205, a "remove directory" button 207, a "clear" button 209, an "add file" button 211, a "remove file" button 213, a "start" button 215, and a "cancel" button 217 on a right-hand side as shown in FIG. 4. The add directory button 205 and the remove directory button 207 are buttons to be clicked when a directory is added to and removed from the directory area 201 respectively. When these buttons 205, 207 are clicked, for example, a file reference dialog is presented, and the user can designate a directory through the dialog. That is, the user can add or remove files from the directories designated through the dialog. The clear button 209 is a button to be clicked when all the files displayed in the objective document list area 203 are removed therefrom. The add file button 211 and the remove file button 213 are buttons to be clicked when a specific electronic document to be processed is added to and removed from the objective document list area 203. The start button 215 is a button to be clicked when the authenticating process is applied in a batch to the objective electronic documents presented in the objective document list area 203.

Figure 17:
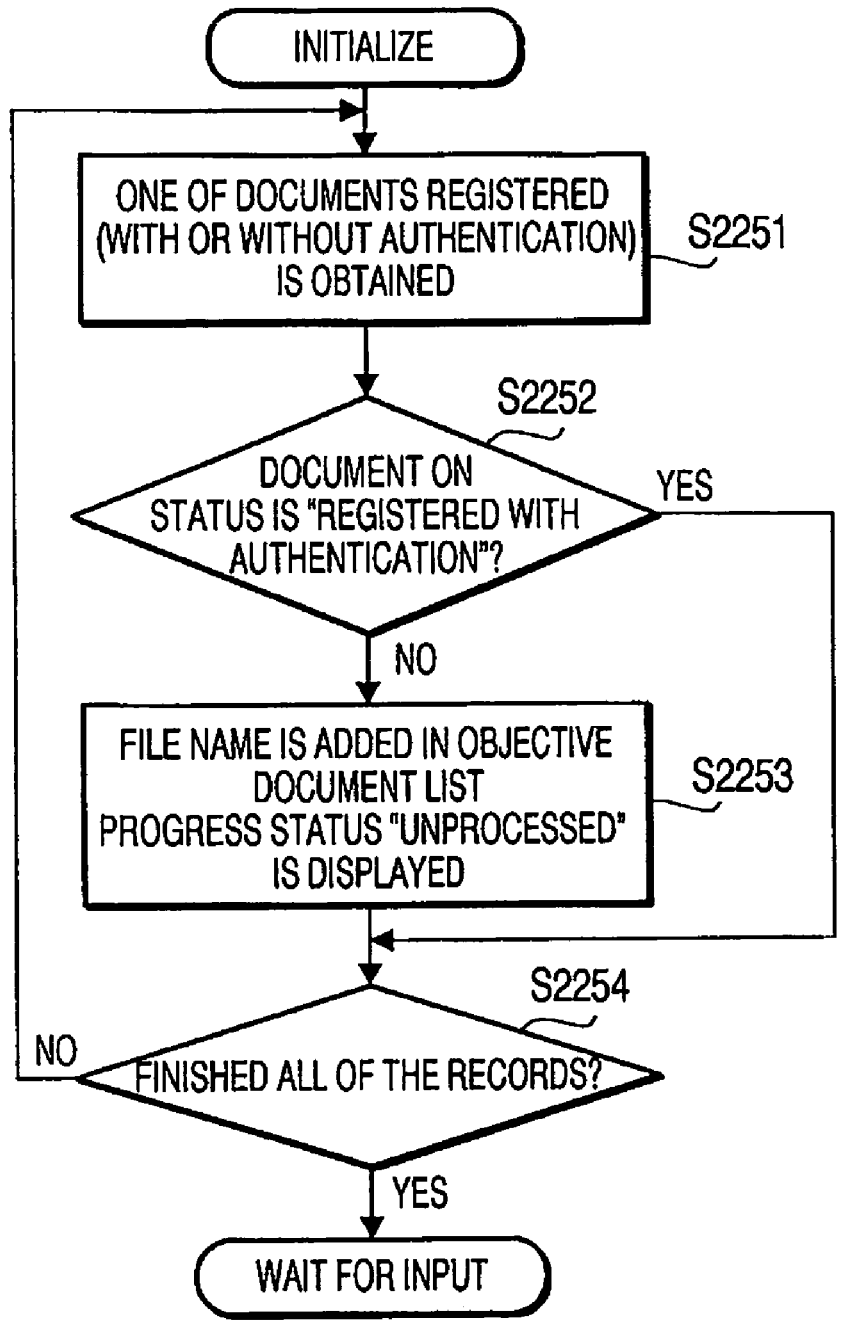
FIG. 17 is a flowchart to illustrate an initialize routine of the registration program to be run in the document registration system according to the embodiment of the present invention.

As the batch processing mode M2 is activated, an initialize routine starts. FIG. 17 is a flowchart to illustrate the initialize routine according to the embodiment of the present invention. As the routine starts, in S2251, one of the electronic documents registered (with or without authentication) in the database of the storage unit 3 is obtained. In S2252, it is judged as to whether the registration status of the obtained electronic document is "registered with authentication."

If it is judged that the registration status is not "registered with authentication" (S2252: NO), i.e., the registration status is "registered without authentication", in S2253, a file name of the obtained electronic document is added to the objective document list and displayed in the objective document list area 203. The progress status for the electronic document is indicated to be "unprocessed." Thereafter, the routine proceeds to S2254.

If it is judged that the registration status is "registered with authentication" (S2252: YES), the routine skips S2252 and proceeds to S2254.

In S2254, it is judged as to whether all the registered electronic documents (with or without authentication) in the database have been obtained. If there is a remaining electronic document (S2254: NO), the routine returns to S2251 and repeats S2251-S2253. If all the registered electronic documents are obtained (S2254: YES), the routine is terminated, and the information processing apparatus waits for data input.

Figure 18:
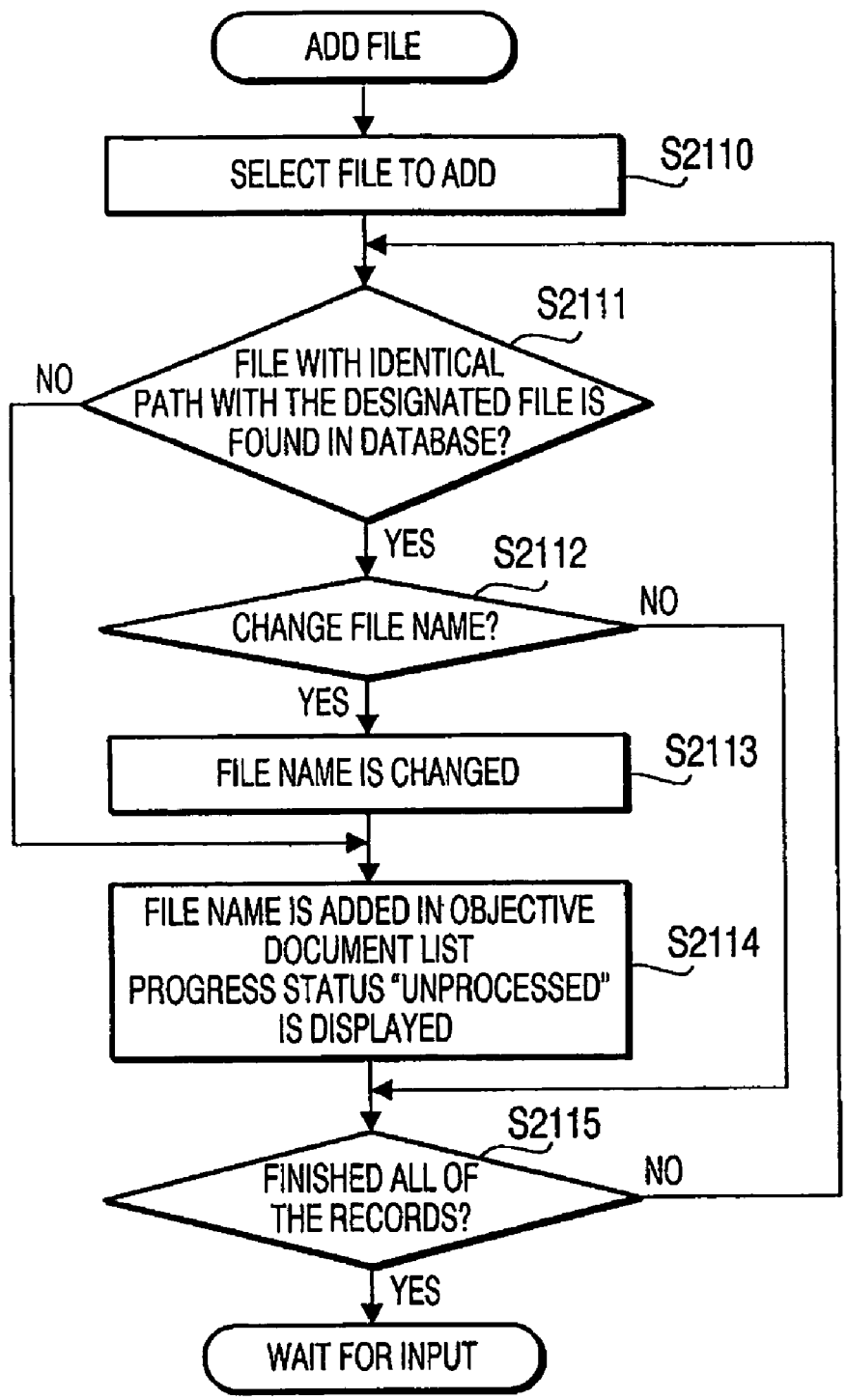
FIG. 18 is a flowchart to illustrate a file add routine of the registration program to be run in the document registration system according to the embodiment of the present invention.

Next, a file add routine will be described with reference to FIG. 18. FIG. 18 is a flowchart to illustrate the file add routine according to the embodiment of the present invention. When the add file button 211 is clicked, the add file routine is initiated. In S2110, a file reference dialog is displayed, and the user is prompted to designate file names of electronic documents to be processed. In S2111, the database is searched through to judge as to whether the electronic document with the file name which is identical to the file name of one of the designated electronic documents is included in the database.

If no file name identical to the file name of the designated electronic document is in the database (S2111: NO), the routine proceeds to S2114. If the electronic document with the identical file name is in the database (S2111: YES), in S2112, a message to inquire the user as to whether the file name of the designated electronic document should be changed is presented.

If the user's input to indicate the name should not be changed is provided (S2112: NO), the routine proceeds to S2115. If the user's input is provided (S2112: YES), in S2113, a process to change the file name to a new unique name is performed. In this regard, the user is prompted to enter the new name.

In S2114, the new file name is added to the objective document list and displayed in the objective document list area 203. In addition, the progress status of the designated electronic document with the new file name is indicated to be "unprocessed." Thereafter, the routine proceeds to S2115.

In S2115, it is judged as to whether all the designated electronic documents have been through S2111-2114. If there is a remaining designated electronic document, the routine returns to S2111 and repeats S2111-S2114.

In S2115, if there is no remaining designated electronic document, the routine is terminated, and the information processing apparatus 2 waits for data input.

When the add directory button 205 is clicked during the batch processing mode M2, a new directory can be added to the directory area 201 and the directory displayed in the directory area 201 can be removed therefrom respectively. The electronic documents included in the directory being presented in the directory area 201 will be automatically added to the objective document list area 203 and referred to as objective files for the batch process. The routine to add files in the designated directory is similar to the add file routine shown in FIG. 18. The routine to remove files or directories removes names of the files or directories from the objective document list area 203.

When the clear button 209 is clicked during the batch processing mode M2, all the file names of the electronic documents being presented in the objective document list area 203 are deleted.

Figure 19:
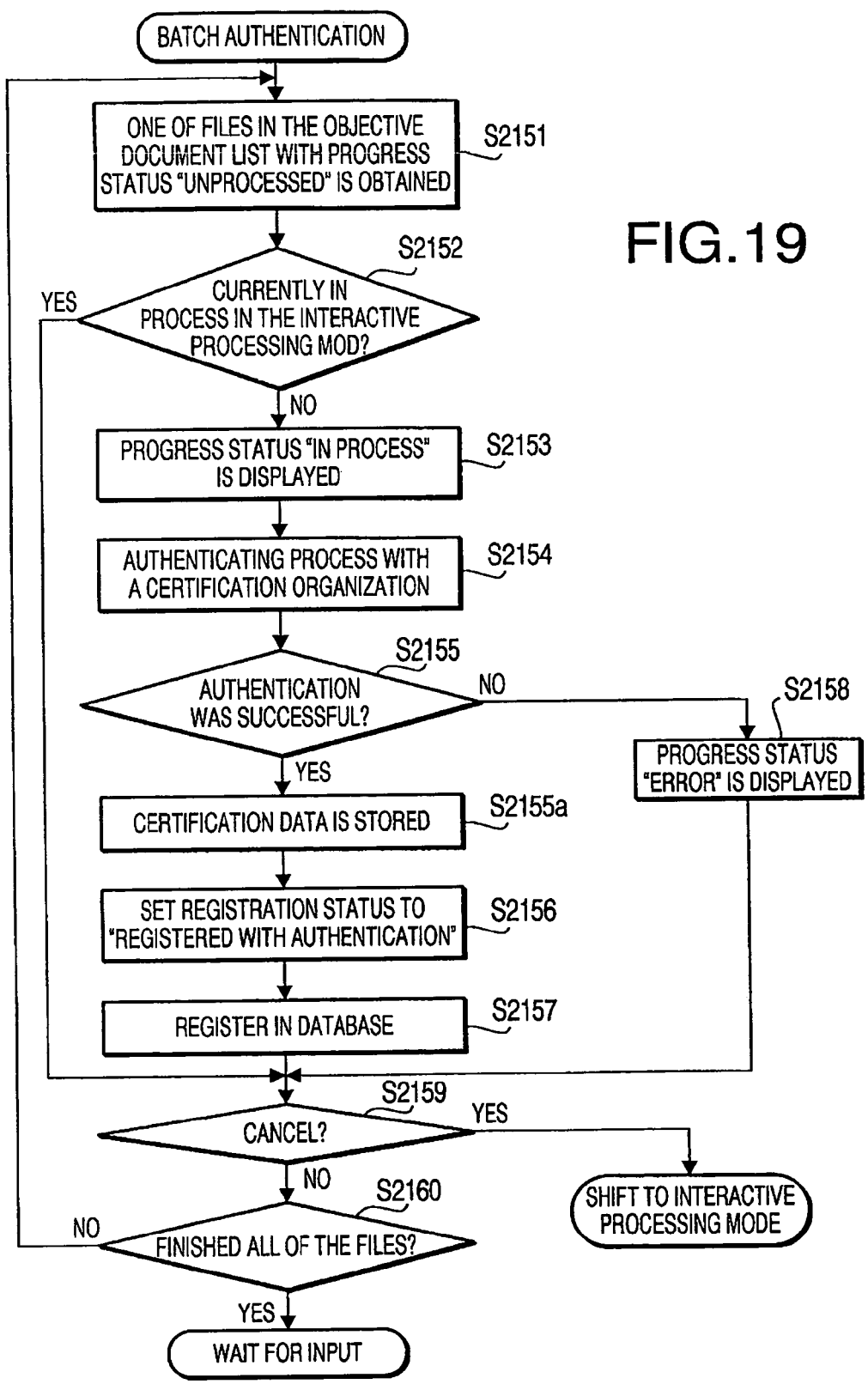
FIG. 19 is a flowchart to illustrate a batch authentication routine of the registration program to be run in the document registration system according to the embodiment of the present invention.

Next, a batch authentication routine will be described with reference to FIG. 19. FIG. 19 is a flowchart to illustrate the batch authentication routine according to the embodiment of the present invention. The batch authentication routine is initiated when the start button 215 is clicked. In the batch authentication routine, the electronic documents being presented in the objective document list area 203 are applied in a batch to the authenticating process provided by the certification organization 9. In S2151, one of the electronic documents included in the objective document list and of which progress status is "unprocessed" is obtained.

In S2152, it is judged as to whether the obtained electronic document is currently in process in the interactive processing mode M3. If the electronic document is in process (S2152: YES), the routine skips S2153-S2157 and proceeds to S2159. Thus, the electronic document in process in the interactive processing mode M3, which is run in the registration program 10 in parallel with the batch processing mode M2, is postponed to follow the other electronic documents which are not in process in the interactive processing mode M3 to be processed through S2153-S2157.

In S2152, if the obtained electronic document is not in process in the interactive processing mode M3 (S2152: NO), in S2153, the progress status of the electronic document presented in the objective document list area 203 is changed to "in process."

In S2154, the authenticating process is performed in interaction with the certification organization. The authenticating process is identical to the process performed in S1171 (see FIG. 9).

Thereafter, in S2155, it is judged as to whether the authentication was successful. If the authentication was not successful (S2155: NO), in S2158, the progress status of the electronic document is set to be "error."

In S2155, if the authentication was successful (S2155: YES), in S2155a, certification data being the associated information of the electronic document is obtained from the certification organization 9 and stored in a storage of the information processing apparatus 2. Thereafter, in S2156, the registration status of the electronic document is set to be "registered with authentication," and the routine proceeds to S2157. In S2157, the electronic document with the associated information is stored to be registered with authentication in a database of the storage unit 3. Thereafter, in S2158, the progress status of the electronic document is set to be "error," and the process proceeds to S2159.

In S2159, it is judged as to whether the cancel button 217 has been clicked. If the cancel button 217 has been clicked (S2159: YES), the batch authentication routine is ceased. In this regard, the process for the electronic document being in progress is canceled. When the routine is terminated, the interactive processing mode M1 is activated.

In S2159, if the cancel button 217 has not been clicked (S2159: NO), in S2160, it is judged as to whether all the electronic documents presented in the objective document list area 203 have been through S2151-S2159.

In S2160, if there is a remaining electronic document (S2160: NO), the routine returns to S2151 and repeats S2151-S2160. If there is all the electronic documents have been through S2151-S2160 (S2160: YES), the routine is terminated, and the information processing apparatus 2 waits for data input.

Figure 20:
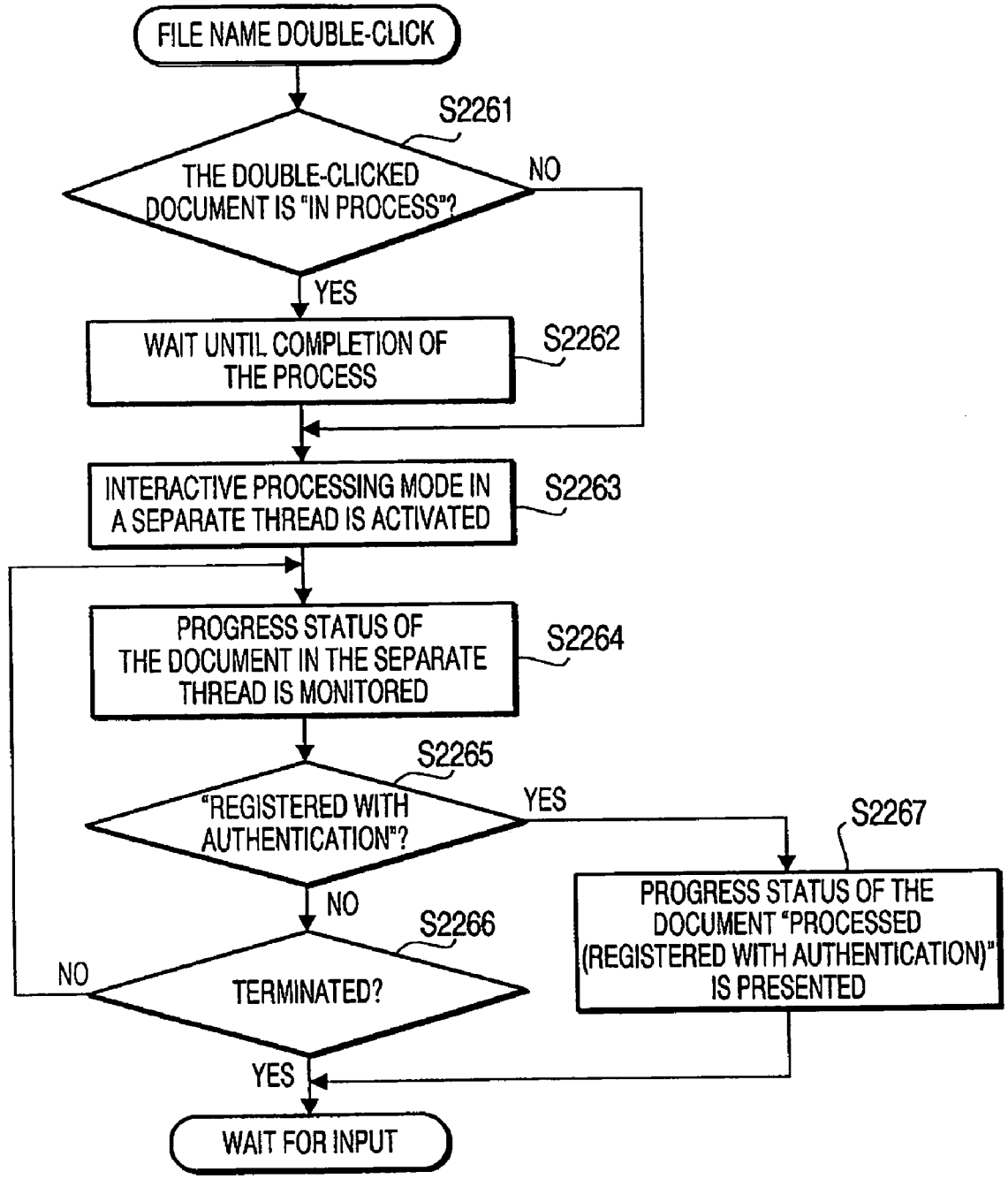
FIG. 20 is a flowchart to illustrate a file name double-click routine of the registration program to be run in the document registration system according to the embodiment of the present invention.

Next, a file name double-click routine will be described with reference to FIG. 20. FIG. 20 is a flowchart to illustrate the file name double-click routine according to the embodiment of the present invention. The file name double-click routine is initiated when a file name of an electronic document in the objective document list area 203 is designated by a double-clicking operation from the user to activate the interactive processing mode M3. That is, the processing modes are switched by the double-clicking operation.

As the routine is initiated, in S2261, it is judged as to whether the progress status of the electronic document of which file name has been double-clicked is "in process." If the progress status is not "in progress" (S2261: NO), the routine proceeds to S2263. If the progress status is "in process" (S2261: YES), in S2262, the routine waits until the process for the double-clicked file is completed.

In S2263, the interactive processing mode M3 is activated in a separate thread. In the initialize routine to be run upon activation of the interactive processing mode M3, in S1251, it is judged that the routine is called during the batch processing mode M2 (S1251: YES). As the dialog window 100 is displayed, in S1253, the next button 107, the previous button 109, the record number field 102, and the batch processing mode button 119 are displayed in gray and set to be incapable of being operated so that the user is not allowed to input through the grayed buttons and field. Thus, the electronic documents other than the specified electronic document, which is being displayed in the preview area 101, are refrained from the registration process. The routines to be run in the interactive processing mode M3 have been described above; therefore, description of those are herein omitted.

In S2264, the progress status of the electronic document in the separate-threaded interactive processing mode M3 is monitored.

In S2265, it is judged as to whether the registration status of the electronic document in the interactive processing mode M3 is set to be "registered with authentication." If the registration status is "registered with authentication" (S2265: YES), in S2267, the progress status of the electronic document which had been double-clicked is presented to be "processed (registered with authentication)." Thereafter, the routine is terminated, and the information processing apparatus waits for data input.

In S2265, if the registration status is not "registered with authentication" (S2265: NO), in S2266, it is judged as to whether the interactive processing mode M3 is terminated.

If the interactive processing mode M3 is not yet terminated (S2265: NO), the routine returns to S2264 and repeats S2264-S2266. If the interactive processing mode M3 is terminated (S2265: YES), the routine is terminated, and the information processing apparatus 2 waits for input.

Thus, a plurality of electronic documents can be applied the registration process (with and without authentication) in a batch in the batch processing mode M2. Further, when one of the electronic documents to be processed in a batch is designated by a double-clicking operation, the interactive processing mode M3 is activated so that the designated electronic document can be registered in the interactive processing mode M3.

In the above configuration, the initialize routine (S2251-S2254) enables creating automatically the list of the electronic documents, which are the objects to be processed in the batch processing mode M2. Meanwhile, S2252 enables extracting an electronic document which has not been applied the registration process from the list. Thus, a workload for the user to create the list can be effectively omitted.

Further, the objective document list area 203 enables to present the electronic documents being the objects to be processed in the batch processing mode M2. It is to be noted that the objective document list area 203 is advantageous for the user to easily recognize the objects and their progress status.

In the above configuration, selection of one of the electronic documents in the objective document list can be made by the double-clicking operation to the electronic document, and the active processing mode can be activated from the batch processing mode to the interactive processing mode M3 thereby. Therefore, the user can easily make a selection to designate the electronic documents to be processed in the interactive processing mode M3 which is activated from the batch processing mode M2.

Further, the interactive processing mode M1 and the batch processing mode M2 can be mutually switched from each other by the batch processing mode button 119 and the cancel button 217.

Furthermore, the file name double-clicking routine (S2261-S2267) enables to activate the interactive processing mode M3 in parallel with the batch processing mode M2 so that the electronic document designated by the double-clicking can be applied the registration process in the interactive processing mode M3. Therefore, for example, a specific electronic document being an object to be processed in the batch processing mode M2 can be processed in the interactive processing mode M3, which is switched to be activated. Moreover, even when an error occurs in an electronic document in the batch processing mode M2, the user can process the electronic document independently in the interactive processing mode M3. Therefore, the electronic documents can be efficiently registered.

It is to be noted that the registration process includes the authenticating process, which is performed in interaction with the certification organization 9. Such interactions through the internet 8 requires longer processing time; therefore, time-efficiency in the document registration system 1 according to the present invention, which manages electronic documents in compliance with the electronic document law, is even more appreciated.

Optionally, in the authenticating process in interaction with the certification organization 9, a procedure to append a digital signature of a document administrator of the organization may be added.

Next, examples of modified embodiments of the present invention will be described. In the modified embodiment, the batch authentication routine shown in FIG. 19 and the file name double-click routine shown in FIG. 20 in the previous embodiment are replaced with routines shown in FIGS. 21 and 22 respectively.

Figure 21:
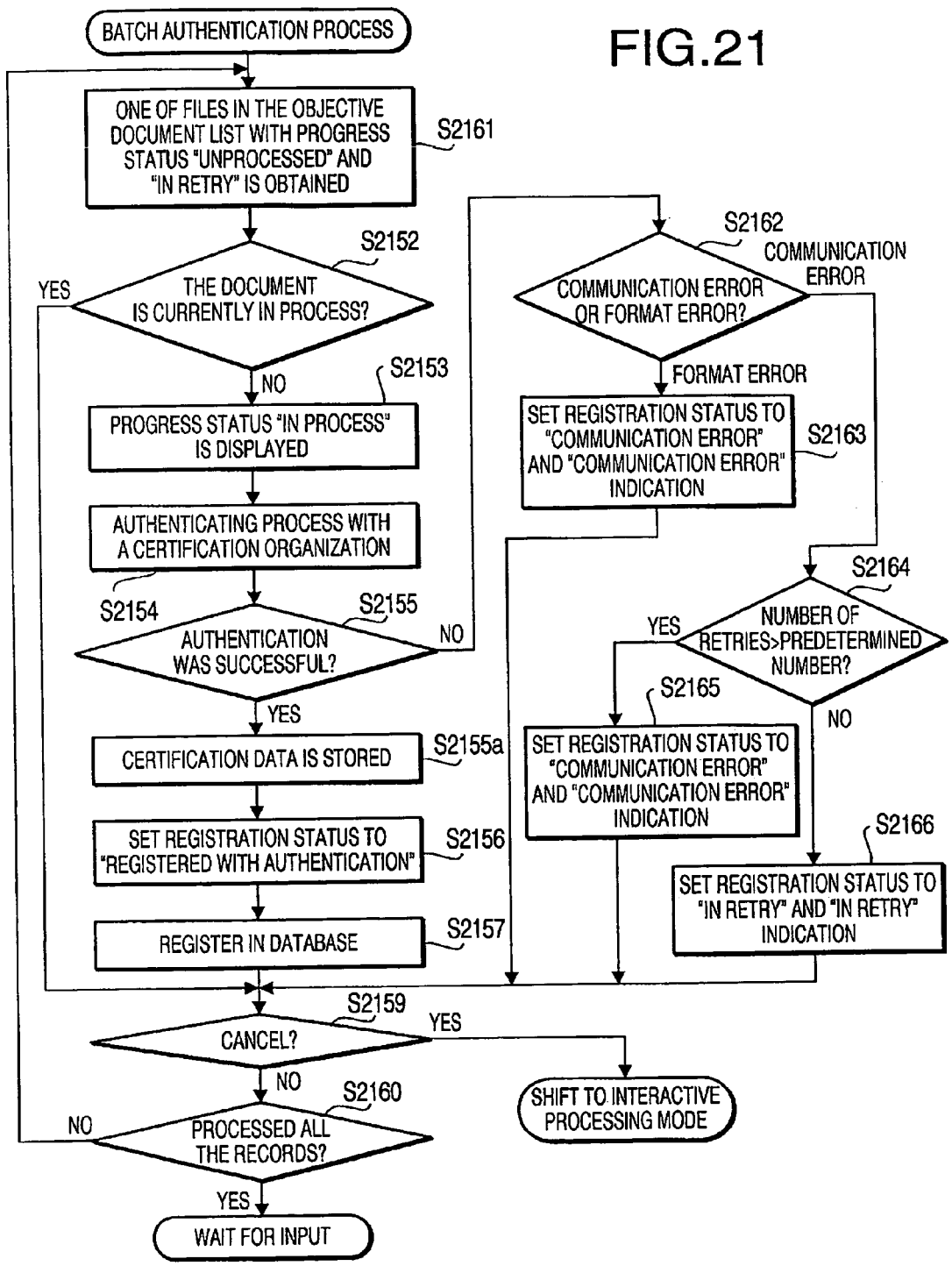
FIG. 21 is a flowchart to illustrate a batch authentication routine of the registration program to be run in the document registration system according to a modified embodiment of the present invention.
Figure 22:
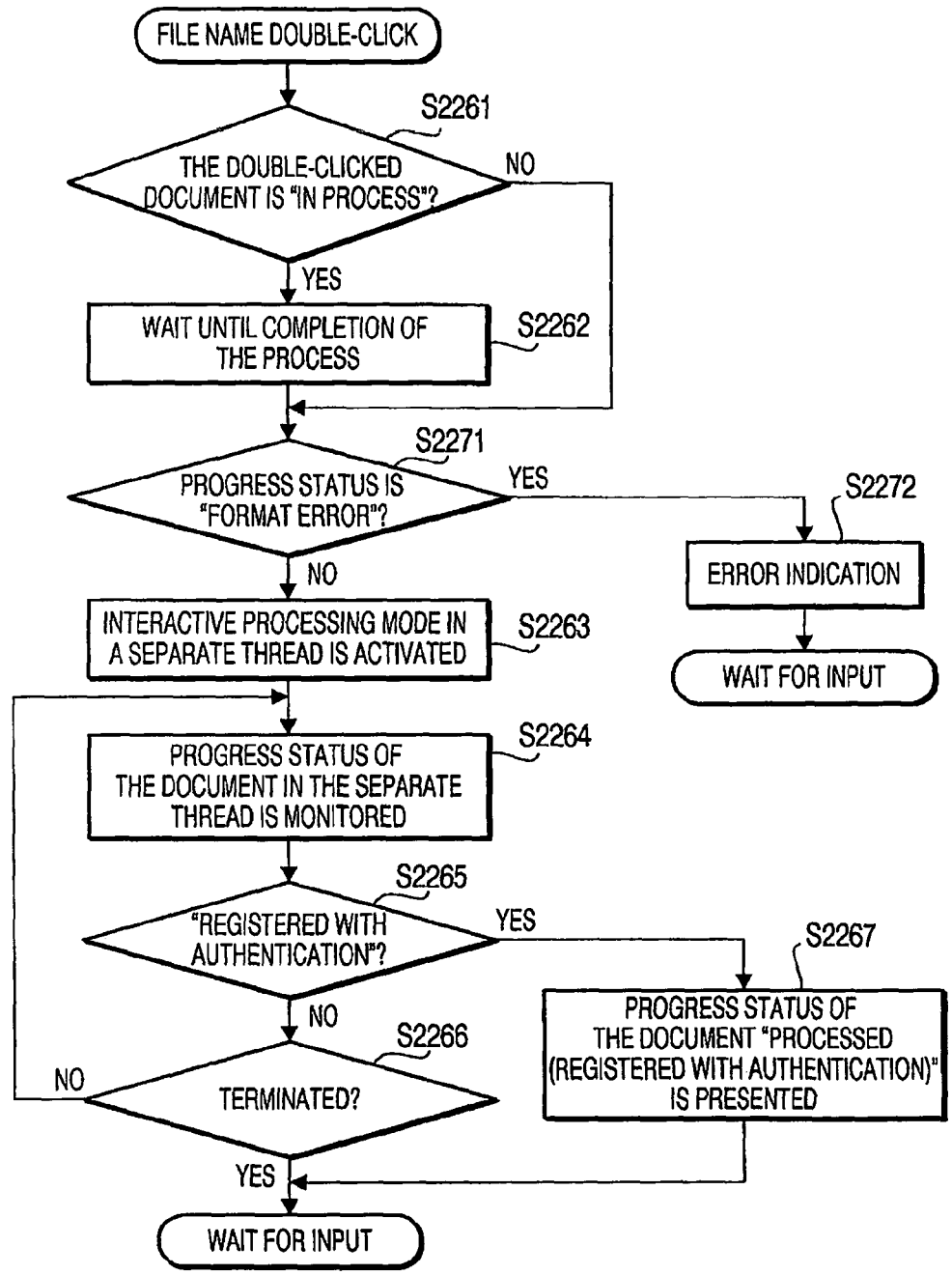
FIG. 22 is a flowchart to illustrate a file name double-click routine of the registration program to be run in the document registration system according to the modified embodiment of the present invention.

FIG. 21 is a flowchart to illustrate the replaced batch authentication routine of the registration program to be run in the document registration system according to the modified embodiment of the present invention. FIG. 22 is a flowchart to illustrate the replaced file name double-click routine of the registration program to be run in the document registration system according to the modified embodiment of the present invention.

In the modified embodiment, actions to be taken by the information processing apparatus 2, when the authenticating process with the certification organization fails, are defined. More specifically, actions to be taken in response to errors occurred in the certification organization 9 are defined in three flows depending on the error, which are a "format error," a "communication error," and a "retry-solvable communication error." The format error in the present embodiment refers to a condition in which the electronic document is in an incorrect format. The communication error refers to a condition in which communication between the information processing apparatus 2 and the certification organization 9 cannot be established due to failure in connection through the internet 8 regardless of a predetermined number of retrials. The retry-solvable communication error refers to a condition in which the communication cannot be established due to failure in connection through the internet 8, but the number of retrials has not reached to the predetermined retry number.

Hereinafter, the modified batch authentication routine and the modified file name double-click routine will be described. However, the steps identical to those in the batch authentication routine and the file name double-click routine in the previous embodiment are omitted herein.

In FIG. 21, S2151 and S2158 in FIG. 19 are replaced with S2161 and S2162-S2166 respectively.

As the batch authentication process is initiated, in S2161, one of the electronic documents included in the objective document list and of which progress status is "unprocessed" or "in retry" is obtained. Steps S2152-S2155 to follow S2161 are identical to those in FIG. 19.

In S2155, if the authentication was not successful (S2155: NO), in S2162, it is judged as to whether the error occurred is one of a communication error and a format error.

In S2162, if the error is a format error, the routine proceeds to S2163. In S2163, the progress status "format error" is presented. Thereafter, the routine proceeds to S2159.

In S2162, if the error is a communication error, the routine proceeds to S2164. In S2164, it is judged as to whether the number of retrials exceeded the predetermined number.

If the number of retrials exceeded the predetermined number (S2164: YES), in S2165, the progress status "communication error" is presented, and the routine proceeds to S2159.

In S2164, if the number of retrials is within the predetermined number (S2164: NO), in S2166, the progress status "in retry" is presented, and the routine proceeds to S2159.

Thus, with the above steps, even when an error occurs in the authenticating process, the authenticating process can be automatically retried depending on the type of the error. Therefore, a manual operation of the user can be omitted.

Next, the modified file name double-click routine will be described. FIG. 22 includes S2271 and S2272, which are inserted between S2261 and S2263 shown in FIG. 20. In S2271, it is judged as to whether the progress status of the electronic document, of which file name has been double-clicked, is "format error."

If the progress status is not "format error" (S2271: NO), the routine proceeds to S2263 and follows the flow as has been described above.

If the progress status is "format error" (S2271: YES), in S2272, an error indication including a message to inform the user that a format error is found in the designated file, and the registration process cannot be applied even in the interactive processing mode is presented on the display screen 2a of the information processing apparatus 2. Thereafter, the routine is terminated and the information processing apparatus 2 waits for input.

Thus, in the modified file name double-click routine, when an error is found in the designated electronic document, activation of the interactive processing mode M3 can be restricted depending on the error type.

Although examples of carrying out the invention has been described, those skilled in the art will appreciate that there are numerous variations and permutations of the document registration system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiments, the paper-based documents are read by the scanning apparatus 5 so that data representing the electronic documents are generated; however, the document registration system 1 may obtain externally-generated data representing the electronic documents for the interactive processes.

Further, in the above embodiments, the ready-generated data representing the electronic documents are processed to be registered in the batch processing mode M2; however, a plurality of paper-based documents may be continuously read by the scanning apparatus 5 to automatically generate the data to be processed in the batch processing mode M2.

The original documents to be processed in the document registration system 1 according to the present invention may be documents recorded on paper and on microfilms.

For another example, the storage unit 3 may be integrally configured with the information processing apparatus 2.

What is claimed is:

1. A document registration system for registering a plurality of electronic documents, comprising:
    an information processing apparatus having a display unit configured to display information related to the electronic documents;
    a storage unit configured to store the registered electronic documents;
    memory having instructions stored therein that, when executed by the information processing apparatus, cause the information processing apparatus to operate as:
        a registration unit, which is configured to perform a registration process to register the electronic documents in an interactive processing mode and in a batch processing mode, wherein when in the interactive processing mode the electronic documents are registered manually, and wherein when in the batch processing mode the electronic documents are registered automatically in a batch; and
        a switching unit, which is configured to switch between activating the interactive processing mode and the batch processing mode, wherein the interactive processing mode and the batch processing mode are activated in parallel with each other, and
        wherein the switching unit is further configured to switch from the interactive processing mode to the batch processing mode while the interactive processing mode is active, and from the batch processing mode to the interactive processing mode while the batch processing mode is active.

2. The document registration system according to claim 1, wherein the
    switching unit is further configured to activate the interactive processing mode while the batch processing mode is activated when one of the electronic documents being processed in the batch processing mode is designated for processing manually in the interactive processing mode.

3. The document registration system according to claim 2, wherein the memory has further instructions stored therein that, when executed by the information processing apparatus, cause the information processing apparatus to further operate as:
    a list creation unit to automatically create a list of electronic documents which are designated for processing in the batch processing mode.

4. The document registration system according to claim 3, wherein the memory has further instructions stored therein that, when executed by the information processing apparatus, cause the information processing apparatus to further operate as:
    an extracting unit to extract electronic documents, to which the registration process has not been applied, from the electronic documents included in the list.

5. The document registration system according to claim 3, wherein the memory has further instructions stored therein that, when executed by the information processing apparatus, cause the information processing apparatus to further operate as:

a list presentation unit to display the list of electronic documents created by the list creation unit on the display unit.

6. The document registration system according to claim 5, wherein the list includes progress information, which represents a status of the registration process in the batch processing mode for each of the electronic documents included in the list.

7. The document registration system according to claim 5, wherein the switching unit is further configured to activate the interactive processing mode by receiving a designation of the electronic document for processing manually in the interactive processing mode among the electronic documents presented in the list.

8. The document registration system according to claim 3, wherein the list indicates an electronic document, which is paused during the registration process.

9. The document registration system according to claim 1, wherein the registration process includes a process to add a time stamp to the electronic document.

10. The document registration system according to claim 1, wherein the registration process includes a process to provide a digital signature to the electronic document.

11. The document registration system according to claim 1, comprising a scanning unit to read a visually readable document to generate data representing the electronic document.

12. The document registration system according to claim 11, wherein the visually readable document includes a document recorded on a microfilm.

13. The document registration system according to claim 1, wherein the information processing apparatus is configured to be connected to a network, and wherein the registration process is performed in interaction with a certification organization which is connected with the information processing apparatus through the network.

14. The document registration system according to claim 1, wherein the switching unit is further configured to switch between activating the interactive processing mode and the batch processing mode in response to user input.

15. An information processing apparatus for registering a plurality of electronic documents manually one-by-one and automatically in a batch, comprising:
    a display unit to display information related to the electronic documents;
    a processor; and
    memory having instructions stored therein that, when executed by the processor, cause the processor to operate as:
        a registration unit, which is configured to perform a registration process to register the electronic documents in an interactive processing mode and in a batch processing mode, wherein when in the interactive processing the electronic documents are registered manually, and wherein when in the batch processing mode the electronic documents are registered automatically in a batch; and
        a switching unit, which is configured to switch between activating the interactive processing mode and the batch processing mode, wherein the interactive processing mode and the batch processing mode are activated in parallel with each other, and
        wherein the switching unit is further configured to switch from the interactive processing mode to the batch processing mode while the interactive processing mode is active, and from the batch processing mode to the interactive processing mode while the batch processing mode is active.

16. The information processing apparatus according to claim 15, wherein the switching unit is further configured to switch between activating the interactive processing mode and the batch processing mode in response to user input.

17. A non-transitory computer usable medium comprising computer readable instructions which, when executed by a computer, cause the computer to:
    activate an interactive processing mode, in which a plurality of electronic documents are registered manually one-by-one; and
    when a batch processing mode is called, cancel the interactive processing mode and activate the batch processing mode,
        wherein when in the batch processing mode the electronic documents are registered automatically in a batch,
        wherein the interactive processing mode and the batch processing mode are activated in parallel with each other,
        wherein the interactive processing mode is configured to be switched to the batch processing mode while the interactive processing mode is active, and
        wherein the batch processing mode is configured to be switched to the interactive processing mode while the batch processing mode is active.

18. The non-transitory computer usable medium according to claim 17, wherein the batch processing mode is called in response to user input.

* * * * *